US012659071B2

(12) United States Patent (10) Patent No.: US 12,659,071 B2
Liu et al. (45) Date of Patent: Jun. 16, 2026

(54) DATA TRANSMISSION METHOD AND APPARATUS

(71) Applicant: Huawei Technologies Co., Ltd., Shenzhen (CN)

(72) Inventors: Xianda Liu, Beijing (CN); Dan Hu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 667 days.

(21) Appl. No.: 17/937,280

(22) Filed: Sep. 30, 2022

(65) Prior Publication Data

US 2023/0031559 A1 Feb. 2, 2023

Related U.S. Application Data

(63) Continuation of application No. PCT/CN2020/082959, filed on Apr. 2, 2020.

(51) Int. Cl.
H04L 1/00 (2006.01)
H04L 1/1607 (2023.01)
(Continued)

(52) U.S. Cl.
CPC .......... H04L 1/0038 (2013.01); H04L 1/1642 (2013.01); H04W 24/08 (2013.01); H04W 72/1273 (2013.01); H04W 72/23 (2023.01)

(58) Field of Classification Search
CPC ... H04L 1/0038; H04L 1/1642; H04L 5/0051; H04L 5/0094; H04L 5/0048;
(Continued)

(56) References Cited

U.S. PATENT DOCUMENTS

2020/0100223 A1* 3/2020 Park ..................... H04L 5/0092
2022/0104185 A1 3/2022 Moon et al.
(Continued)

FOREIGN PATENT DOCUMENTS

CN 102447529 B 9/2017
CN 109565834 A 4/2019
(Continued)

OTHER PUBLICATIONS

WO 2013071718 A1 (Year: 2013).*
(Continued)

*Primary Examiner* — Mandish K Randhawa
(74) *Attorney, Agent, or Firm* — Slater Matsil, LLP

(57) ABSTRACT

This application provides a data transmission method and apparatus. The method includes: A network device sends DCI on at least two PDCCH candidates; and correspondingly, a terminal device performs blind detection on the at least two PDCCH candidates, where the DCI is used to schedule a physical shared channel, the at least two PDCCH candidates are associated with different CORESETs, and an association relationship exists between the at least two PDCCH candidates. The terminal device determines the downlink control information DCI based on a result of blind detection performed on the at least two PDCCH candidates, and the network device sends or receives the physical shared channel based on the DCI; and correspondingly, the terminal device receives or sends the physical shared channel based on the DCI.

20 Claims, 5 Drawing Sheets

(51) Int. Cl.
H04W 24/08 (2009.01)
H04W 72/1273 (2023.01)
H04W 72/23 (2023.01)

(58) Field of Classification Search
CPC ............................ H04L 5/0053; H04W 24/08;
H04W 72/1273; H04W 72/23
See application file for complete search history.

(56) References Cited

U.S. PATENT DOCUMENTS

2022/0158783 A1* 5/2022 Matsumura ........... H04L 5/0032
2023/0362950 A1* 11/2023 Moon ................... H04B 7/0695

FOREIGN PATENT DOCUMENTS

| | | |
|---|---|---|
| CN | 110475317 A | 11/2019 |
| CN | 110535614 A | 12/2019 |
| WO | 2019011307 A1 | 1/2019 |
| WO | 2019031850 A1 | 2/2019 |
| WO | 2019139955 A1 | 7/2019 |
| WO | 2020033647 A1 | 2/2020 |

OTHER PUBLICATIONS

3rd Generation Partnership Project; Technical Specification Group Radio Access Network; NR; Physical layer procedures for data (Release 16), 3GPP TS 38.214, Dec. 2019, 147 Pages, V16.0.0.
3rd Generation Partnership Project; Technical Specification Group Radio Access Network; NR; Physical layer procedures for control (Release 16), 3GPP TS 38.213, Dec. 2019, 146 Pages, V16.0.0.
LG Electronics, "Discussion on PDCCH repetition for URLLC", 3GPP TSG RAN WG1 Meeting #92bis, Apr. 16-20, 2018, 4 Pages, Sanya, China.

* cited by examiner

DATA TRANSMISSION METHOD AND APPARATUS

CROSS-REFERENCE TO RELATED APPLICATIONS

This application is a continuation of International Application No. PCT/CN2020/082959, filed on Apr. 2, 2020, the disclosure of which is hereby incorporated by reference in its entirety.

TECHNICAL FIELD

This application relates to the communication field, and in particular, to a data transmission method and apparatus.

BACKGROUND

In a communication system, for example, a long term evolution (LTE) system and a new radio (NR) system, downlink control information (DCI) is carried on a physical downlink control channel (PDCCH). A PDCCH candidate is used to specify a blind detection behavior of a terminal device. Generally, a network device selects one of a plurality of PDCCH candidates to send DCI. The terminal device does not know which PDCCH candidate is selected by the network device from the plurality of PDCCH candidates. Therefore, the terminal device needs to perform blind detection on the plurality of PDCCH candidates, that is, attempts to demodulate and decode PDCCHs one by one until a PDCCH channel can be successfully found to obtain the DCI. A search space set (SSS) includes one or more PDCCH candidates. That the terminal device performs blind detection on the PDCCH candidates may also be understood as that the terminal device performs blind detection in the SSS.

A control resource set (CORESET) is a physical resource set configured by the network device for carrying downlink control information (DCI). One SSS may be associated with at least two CORESETs, and different TCI states may be configured for different CORESETs. To improve reliability of PDCCH transmission, the network device may send information bits of same DCI on the at least two CORE-SETs, and the terminal device may combine DCI obtained by using the at least two CORESETs to obtain the final DCI. Because a monitoring occasion is configured for the SSS, when one SSS is associated with at least two CORESETs, monitoring occasions of the at least two CORESETs are the same. In this case, DCI is sent at a same moment, leading to poor flexibility of delivering the DCI by the network device.

SUMMARY

Embodiments provide a data transmission method and apparatus, to help improve flexibility of delivering DCI by a network device, and improve data transmission efficiency.

A first embodiment provides a data transmission method. The method includes: A terminal device performs blind detection on at least two physical downlink control channel PDCCH candidates, where the at least two PDCCH candidates are associated with different control resource sets CORESETs, and an association relationship exists between the at least two PDCCH candidates. The terminal device determines downlink control information DCI based on a result of blind detection performed on the at least two PDCCH candidates, where the DCI is used to schedule a physical shared channel. The terminal device receives or sends the physical shared channel based on the DCI.

Optionally, an alternative manner in which the at least two PDCCH candidates are associated with different control resource sets CORESETs is: The at least two PDCCH candidates may be associated with at least two TCI states configured in a same CORESET.

According to the data transmission method in embodiments of this application, the association relationship between the at least two PDCCH candidates is configured, where the at least two PDCCH candidates belong to different SSSs, and the at least two PDCCH candidates are associated with different CORESETs. In this way, the at least two PDCCH candidates that have the association relationship may be received by using different QCL assumptions, and monitoring occasions may be independently configured for different SSSs corresponding to the at least two PDCCH candidates. This helps improve flexibility of delivering DCI by a network device, and improve data transmission efficiency.

"An association relationship exists between PDCCH candidates" means that the terminal device needs to obtain DCI signaling based on a plurality of PDCCH candidates that have an association relationship, where the DCI signaling may be used to schedule at least one PUSCH or at least one PDSCH. It should be understood that the at least two PDCCH candidates belong to different SSSs.

It should be understood that, that an association relationship exists between the at least two PDCCH candidates only indicates that information bits sent on the at least two PDCCH candidates are in same DCI, but does not mean that the network device definitely sends the DCI on the at least two PDCCH candidates. For the network device, the network device may send the DCI on one or more PDCCH candidates in the at least two PDCCH candidates that have an association relationship. For the terminal device, the terminal device needs to perform the blind detection on the at least two PDCCH candidates that have an association relationship, and determine DCI based on a result of the blind detection performed on the at least two PDCCH candidates. In other words, information bits on PDCCH candidates that have an association relationship also have an association relationship, and are used by the terminal device to determine DCI.

With reference to the first embodiment, in some implementations of the first embodiment, the information bits on the at least two PDCCH candidates each include all information bits of the DCI; or the information bits on the at least two PDCCH candidates each include a part of information bits of the DCI.

In a first possible implementation, the information bits on the at least two PDCCH candidates each include all the information bits of the DCI. The terminal device may separately receive the information bits on the at least two PDCCH candidates, separately perform maximum likelihood detection and soft decision, and perform soft combination on obtained two soft information bits, to obtain the final DCI. In this embodiment, a probability of correct detection can be improved in a soft combination process, and then reliability of DCI detection is improved. In addition, two pieces of DCI information are separately transmitted through channels with low correlation, so that a gain of a soft combination operation can be increased, and robustness is better.

In a second possible implementation, the information bits on the at least two PDCCH candidates each include a part of the information bits of the DCI. The part of information bits herein may be any part of information bits of DCI signaling. The network device may add information bits of DCI signaling to at least two CORESETs, and send signals carried on different CORESETs by using different TRPs. The terminal device may separately receive the information bits on the at least two PDCCH candidates, separately perform detection, and obtain the final DCI based on obtained at least two pieces of information. In this embodiment, it may be understood that, at least two PDCCH candidates at a small aggregation level (AL) may be aggregated to form a PDCCH candidate at a large AL, for example, two PDCCH candidates at an AL of 4 may form a PDCCH candidate at an AL of 8. The DCI signaling in this embodiment has low channel correlation in a transmission process, and has a diversity gain. Compared with the foregoing first possible implementation, complexity of blind detection performed by the terminal device in this implementation is lower.

It should be understood that a process in which the terminal device obtains DCI signaling on the at least two PDCCH candidates may include a plurality of implementations. For example, the terminal device may first perform decoding, and then combine decoded information bits. Alternatively, the terminal device may first combine detected information, and then perform decoding to obtain final information bits. This is not limited in embodiments of this application.

With reference to the first embodiment, in some implementations of the first embodiment, the at least two PDCCH candidates have a same AL and a same sequence number; or the at least two PDCCH candidates have different ALs and a same sequence number.

Because a PDCCH candidate belongs to an SSS, an association relationship between the at least two PDCCH candidates may also be essentially understood as an association relationship between PDCCH candidates in different SSSs. For example, an association relationship may be configured or agreed on between a PDCCH candidate of an SSS 1 and a PDCCH candidate of an SSS 2. Further, an association relationship may be configured or agreed on between one or more PDCCH candidates of the SSS 1 and one or more PDCCH candidates of the SSS 2.

In a possible implementation, the at least two PDCCH candidates have a same AL and a same sequence number. That is, an association relationship may be agreed on in advance between the PDCCH candidates with the same sequence number and at the same AL. The sequence number herein is at an AL level, that is, the PDCCH candidates are numbered at a same AL in a same SSS. For example, PDCCH candidates with different sequence numbers at a same AL may include non-overlapping time-frequency resource elements, for example, control channel elements (CCE). In this embodiment, after performing blind detection, the terminal device may perform the soft combination operation on information bits corresponding to the PDCCH candidates with a same sequence number at a same AL or combine decoded information bits. It should be understood that PDCCH candidates that have no association relationship do not belong to the at least two PDCCH candidates, and the terminal device may independently perform the blind detection operation, for example, parsing or decoding, on the PDCCH candidates.

In this way, the terminal device performs the soft combination operation on PDCCH candidates at a same AL, so that processing complexity for the terminal device can be reduced. In addition, a one-to-one association relationship may exist between the PDCCH candidates, or an association relationship exists between only a part of PDCCH candidates in different SSSs, so that processing complexity for the terminal device can be further reduced.

In another possible implementation, the at least two PDCCH candidates have different ALs and a same sequence number. That is, an association relationship exists between PDCCH candidates with a same sequence number at a specific AL (pre-defined or configured). The foregoing sequence number is at an AL level, that is, PDCCH candidates are numbered at a same AL in a same SSS. The foregoing different ALs may be agreed on in advance or configured by the network device. In this embodiment, after performing blind detection, the terminal device may perform a soft combination operation on information bits corresponding to the PDCCH candidates with the same sequence number at the specific AL (pre-defined or configured) or combine decoded information bits. It should be understood that PDCCH candidates that have no association relationship do not belong to the at least two PDCCH candidates, and the terminal device may independently perform the blind detection operation, for example, parsing or decoding, on the PDCCH candidates.

That PDCCH candidates with a same sequence number at a specific AL (pre-defined or configured) have an association relationship may be classified into the following two cases: Case 1: There is a one-to-one association relationship between ALs, that is, an association relationship exists between a PDCCH candidate at one AL and a PDCCH candidate at another AL. Because channels of different TRPs are different, the at least two PDCCH candidates that have the association relationship are configured to have different ALs, so that different ALs can be configured for different TRPs based on channel conditions to send DCI. Flexibility is high. In addition, there is a one-to-one association relationship between PDCCH candidates, so that processing complexity for the terminal device can be further reduced. Case 2: There is a one-to-many relationship between ALs, that is, an association relationship exists between a PDCCH candidate at one AL and PDCCH candidates at at least two ALs. Because channels of different TRPs are different, the at least two PDCCH candidates that have the association relationship are configured to have different ALs, so that different ALs can be configured for different TRPs based on channel conditions to send DCI. Flexibility of delivering DCI by the network device is improved.

With reference to the first embodiment, in some implementations of the first embodiment, before the terminal device receives or sends the physical shared channel based on the DCI, the method further includes: The terminal device determines a reference position, where the reference position is determined based on at least one CORESET in at least two CORESETs or at least one PDCCH candidate in the at least two PDCCH candidates; and the terminal device determines a start position of the physical shared channel based on the reference position. That the terminal device receives or sends the physical shared channel based on the DCI includes: The terminal device receives or sends the physical shared channel based on the start position of the physical shared channel.

The reference position may be determined based on at least one SSS in at least two SSSs that have an association relationship, or determined based on the at least one PDCCH candidate in the at least two PDCCH candidates that have an association relationship. Specifically, the network device and the terminal device may determine the reference position through agreement in a protocol according to an agreed rule, and then determine the start position of the physical shared channel.

In this embodiment of this application, when the network device indicates a DCI format of S by using a start position of a monitoring occasion of a PDCCH as the reference position, the terminal device may determine an actual start position of the physical shared channel according to the agreed rule, to ensure that the start position is consistent with an actual start position of the physical shared channel delivered by the network device. This helps improve efficiency of monitoring and receiving the physical shared channel.

With reference to the first embodiment, in some implementations of the first embodiment, the reference position is a reference position determined based on one CORESET in the at least two CORESETs or one PDCCH candidate in the at least two PDCCH candidates. Therefore, the network device and the terminal device may determine the start position of the physical shared channel based on the reference position.

For example, it may be agreed that a start symbol position of a monitoring occasion of an SSS corresponding to a CORESET with a largest sequence number or a smallest sequence number in the at least two CORESETs is the reference position.

For example, it may be agreed that a start symbol position of a monitoring occasion of an SSS corresponding to a PDCCH candidate with a largest sequence number or a smallest sequence number in the at least two PDCCH candidates is the reference position.

For example, it may be agreed that a start symbol position of a monitoring occasion of an SSS with a largest sequence number or a smallest sequence number in the at least two SSSs is the reference position.

For example, it may be agreed that a start symbol position of a monitoring occasion of an SSS corresponding to a PDCCH candidate with a foremost time domain position or a rearmost time domain position in the at least two PDCCH candidates is the reference position.

With reference to the first embodiment, in some implementations of the first embodiment, that the terminal device determines the start position of the physical shared channel based on the reference position includes: The terminal device determines the start position of the physical shared channel based on the reference position and a first field in the DCI, where the first field indicates an offset of the start position of the physical shared channel relative to the reference position.

In embodiments of this application, the DCI is in a simplified DCI format, and the terminal device determines only one reference position. Specifically, it is agreed in a protocol that a start position of a monitoring occasion of a specific SSS is used as the reference position. The network device may determine, according to the rule, the actual position of the physical shared channel and a first field in DCI delivered in the at least two SSSs that have the association relationship. The terminal device may determine a reference position according to the rule, and determine the start position of the physical shared channel based on the reference position and the first field in the DCI obtained through blind detection.

With reference to the first embodiment, in some implementations of the first embodiment, the reference position is at least two reference positions determined based on start symbol positions of monitoring occasions corresponding to the at least two CORESETs or the at least two PDCCH candidates. Therefore, the network device and the terminal device may determine the start position of the physical shared channel based on the at least two reference positions.

With reference to the first embodiment, in some implementations of the first embodiment, that the terminal device determines the start position of the physical shared channel based on the reference position includes: The terminal device determines at least two start positions based on the at least two reference positions and a first field in the DCI, where the first field indicates offsets of the at least two start positions relative to the at least two reference positions.

In embodiments of this application, the DCI may be in a simplified DCI format, and the terminal device may determine the at least two reference positions, that is, determine one reference position for each CORESET or each PDCCH candidate. Specifically, the network device may deliver a same original bit of the DCI on the at least two SSSs, the terminal device may separately determine the at least two reference positions based on monitoring occasions corresponding to the at least two SSSs, and the terminal device may determine the at least two start positions based on the at least two reference positions and the first field in the DCI obtained through blind detection, to receive or send at least two physical shared channels at the at least two start positions.

Optionally, the at least two physical shared channels are at least two times of repeated transmission of a same transmission block (TB). This means that the terminal device may combine soft information received on the at least two physical shared channels, to improve transmission reliability on the physical shared channels.

Optionally, frequency domain resources occupied by the two times of repeated transmission may be determined based on an indication of a same piece of DCI signaling, that is, frequency domain resources occupied by the two times of repeated transmission are the same. Alternatively, a frequency domain interval between the second time of repeated transmission and the first time of repeated transmission may be pre-configured or pre-defined, so that the two times of repeated transmission occupy different frequency domain resources. This improves a frequency diversity gain of transmission.

Optionally, QCL assumptions used for the foregoing two times of repeated transmission are different. In an implementation, the QCL assumptions used for the foregoing two times of repeated transmission are the same as QCL assumptions used for two CORESETs for scheduling the repeated transmission.

With reference to the first embodiment, in some implementations of the first embodiment, the first field includes at least two second fields, where the at least two second fields have a correspondence with the at least two CORESETs or the at least two PDCCH candidates, and the at least two second fields indicate the offsets of the at least two start positions relative to the at least two reference positions. That the terminal device determines at least two start positions based on the at least two reference positions and a first field in the DCI includes: The terminal device determines the at least two start positions based on the at least two reference positions and the at least two second fields.

The at least two second fields are at least two S values indicated by the first field. A quantity of S values indicated by the first field is determined based on a quantity of CORESETs (or SSSs) that have an association relationship. The terminal device may separately determine the corresponding start positions based on the at least two reference positions and the corresponding at least two S values.

Therefore, in embodiments of this application, a plurality of monitoring occasions may be determined based on a plurality of SSSs that have an association relationship to determine a plurality of start positions, to repeatedly transmit a plurality of physical shared channels based on the plurality of start positions. This improves transmission reliability on the physical shared channels.

With reference to the first embodiment, in some implementations of the first embodiment, the monitoring occasions corresponding to the at least two PDCCH candidates have a same start symbol position or a same end symbol position, or the monitoring occasions totally overlap.

In embodiments of this application, start symbol positions or end symbol positions of monitoring occasions of a plurality of SSSs that have an association relationship are limited to be the same, or the monitoring occasions totally overlap. This ensures that the terminal device learns of a correct start position of a physical shared channel while improving reliability of PDCCH detection and a latency, and improves transmission efficiency on the physical shared channel.

A second embodiment provides another data transmission method. The method includes: A network device sends downlink control information DCI on at least two physical downlink control channel PDCCH candidates, where the DCI is used to schedule a physical shared channel, the at least two PDCCH candidates are associated with different control resource sets CORESETs, and an association relationship exists between the at least two PDCCH candidates; and the network device sends or receives the physical shared channel based on the DCI.

With reference to the second embodiment, in some implementations of the second embodiment, information bits on the at least two PDCCH candidates each include all information bits of the DCI; or information bits on the at least two PDCCH candidates each include a part of information bits of the DCI.

With reference to the second embodiment, in some implementations of the second embodiment, the at least two PDCCH candidates have a same aggregation level AL and a same sequence number; or the at least two PDCCH candidates have different ALs and a same sequence number.

With reference to the second embodiment, in some implementations of the second embodiment, before the network device sends the downlink control information DCI on the at least two physical downlink control channel PDCCH candidates, the method further includes: The network device determines a reference position, where the reference position is determined based on at least one CORESET in at least two CORESETs or at least one PDCCH candidate in the at least two PDCCH candidates; and the network device determines a start position of the physical shared channel based on the reference position. That the network device sends or receives the physical shared channel based on the DCI includes: The network device sends or receives the physical shared channel based on the start position.

With reference to the second embodiment, in some implementations of the second embodiment, the reference position is a reference position determined based on one CORESET in the at least two CORESETs or one PDCCH candidate in the at least two PDCCH candidates.

With reference to the second embodiment, in some implementations of the second embodiment, that the network device sends or receives the physical shared channel based on the start position of the physical shared channel includes: The network device determines a first field in the DCI and the start position of the physical shared channel based on the reference position, where the first field indicates an offset of the start position of the physical shared channel relative to the reference position.

With reference to the second embodiment, in some implementations of the second embodiment, the reference position is at least two reference positions determined based on start symbol positions of monitoring occasions corresponding to the at least two CORESETs or the at least two PDCCH candidates.

With reference to the second embodiment, in some implementations of the second embodiment, that the network device sends or receives the physical shared channel based on the start position of the physical shared channel includes: The network device determines a first field in the DCI and at least two start positions based on the at least two reference positions, where the first field indicates offsets of the at least two start positions relative to the at least two reference positions.

With reference to the second embodiment, in some implementations of the second embodiment, the first field includes at least two second fields, where the at least two second fields have a correspondence with the at least two CORESETs or the at least two PDCCH candidates, and the at least two second fields indicate the offsets of the at least two start positions relative to the at least two reference positions. That the network device determines a first field in the DCI and at least two start positions based on the at least two reference positions includes: The network device determines the at least two fields and the at least two start positions based on the at least two reference positions.

With reference to the second embodiment, in some implementations of the second embodiment, monitoring occasions corresponding to the at least two PDCCH candidates have a same start symbol position or a same end symbol position, or the monitoring occasions totally overlap.

A third embodiment provides a data transmission apparatus configured to perform the method according to any possible implementation of the foregoing embodiments. Specifically, the apparatus includes units configured to perform the method according to any possible implementation of the foregoing embodiments.

A fourth embodiment provides a data transmission apparatus including a processor. The processor is coupled to a memory, and may be configured to execute instructions in the memory, to implement the method according to any possible implementation of the foregoing embodiment. Optionally, the communication apparatus further includes a memory. Optionally, the communication apparatus further includes a communication interface, and the processor is coupled to the communication interface.

In an implementation, the data transmission apparatus is a terminal device. When the data transmission apparatus is a terminal device, the communication interface may be a transceiver or an input/output interface.

In another implementation, the data transmission apparatus is a chip disposed in a terminal device. When the data transmission apparatus is a chip disposed in a terminal device, the communication interface may be an input/output interface.

A fifth embodiment provides a processor including an input circuit, an output circuit, and a processing circuit. The processing circuit is configured to receive a signal by using the input circuit, and transmit the signal by using the output circuit, so that the processor performs the method according to any possible implementation of the foregoing embodiments.

In a specific implementation process, the processor may be a chip, the input circuit may be an input pin, the output circuit may be an output pin, and the processing circuit may be a transistor, a gate circuit, a flip-flop, various logic circuits, or the like. An input signal received by the input circuit may be received and input by, for example, but not limited to, a receiver, a signal output by the output circuit may be output to and then transmitted by, for example, but not limited to, a transmitter, the input circuit and the output circuit may be a same circuit, and the circuit is separately used as an input circuit and an output circuit at different moments. Specific implementations of the processor and various circuits are not limited in embodiments of this application.

A sixth embodiment provides a processing apparatus including a processor and a memory. The processor is configured to read instructions stored in the memory, receive a signal by using a receiver, and transmit a signal by using a transmitter, to perform the method according to any possible implementation of the foregoing embodiments.

Optionally, there are one or more processors and memories.

Optionally, the memory may be integrated with the processor, or the memory and the processor are disposed separately.

In a specific implementation process, the memory may be a non-transitory memory, for example, a read-only memory (ROM). The memory and the processor may be integrated on a same chip, or may be separately disposed on different chips. A type of the memory and a manner of disposing the memory and the processor are not limited in embodiments of this application.

It should be understood that a related data exchange process, for example, sending indication information, may be a process of outputting the indication information from the processor, and receiving capability information, may be a process of receiving input capability information by the processor. Specifically, data output by the processor may be output to the transmitter, and input data received by the processor may come from the receiver. The transmitter and the receiver may be collectively referred to as a transceiver.

The processing apparatus in the foregoing sixth embodiment may be a chip, and the processor may be implemented by hardware or software. When the processor is implemented by hardware, the processor may be a logic circuit, an integrated circuit, or the like. When the processor is implemented by software, the processor may be a general-purpose processor, and the processor is implemented by reading software code stored in the memory. The memory may be integrated into the processor or may be located outside the processor and exist independently.

A seventh embodiment provides a computer program product. The computer program product includes a computer program (which may also be referred to as code or instructions). When the computer program is run, a computer is enabled to perform the method according to any possible implementation of the foregoing embodiment.

A eighth embodiment provides a computer-readable storage medium. The computer-readable storage medium stores a computer program (which may also be referred to as code or instructions). When the computer-readable storage medium runs on a computer, the computer is enabled to perform the method according to any possible implementation of the foregoing embodiments.

A ninth embodiments provides a communication system. The communication system includes the foregoing terminal device and network device.

DETAILED DESCRIPTION OF ILLUSTRATIVE EMBODIMENTS

The following describes technical solutions of this application with reference to the accompanying drawings.

The technical solutions in embodiments of this application may be applied to various communication systems, for example, a global system for mobile communications (GSM) system, a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (time division duplex, TDD) system, a universal mobile telecommunication system (UMTS), a worldwide interoperability for microwave access (WiMAX) communication system, a future 5th generation (5th generation, 5G) system, or new radio system (NR).

It should be further understood that the technical solutions in embodiments of this application may be further applied to various communication systems based on a non-orthogonal multiple access technology, for example, a sparse code multiple access (SCMA) system, and SCMA may certainly also be referred to as another name in the communication field. Further, the technical solutions in embodiments of this application may be applied to a multi-carrier transmission system that uses the non-orthogonal multiple access technology, for example, an orthogonal frequency division multiplexing (OFDM) system, a filter bank multi-carrier (FBMC) system, a generalized frequency division multiplexing (GFDM) system, and a filtered orthogonal frequency division multiplexing (filtered-OFDM, F-OFDM) system that uses the non-orthogonal multiple access technology.

Figure 1:
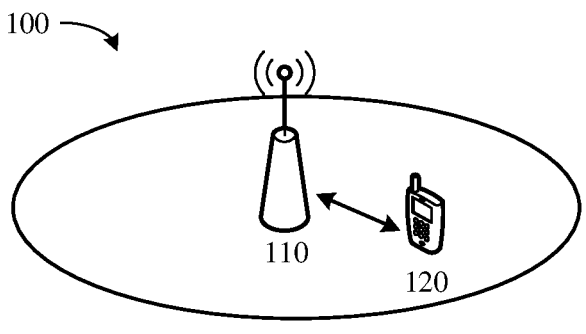
FIG. 1 is a schematic diagram of a communication system according to an embodiment of this application.

For ease of understanding embodiments of this application, a communication system applicable to embodiments of this application is first described in detail with reference to FIG. 1. FIG. 1 is a schematic diagram of a communication system to which an embodiment of this application is applicable. As shown in FIG. 1, the communication system 100 may include at least one network device, for example, a network device 110 shown in FIG. 1. The communication system boo may further include at least one terminal device, for example, a terminal device 120 shown in FIG. 1. The network device 110 may communicate with the terminal device 120 through a radio link. A plurality of antennas may be configured for each communication device such as the network device 110 or the terminal device 120, and the plurality of antennas may include at least one transmit antenna used to send a signal and at least one receive antenna used to receive a signal. In addition, each communication device additionally includes a transmitter chain and a receiver chain. A person of ordinary skill in the art may understand that both the transmitter chain and the receiver chain may include a plurality of components (for example, a processor, a modulator, a multiplexer, a demodulator, a demultiplexer, or an antenna) related to signal sending and receiving. Therefore, the network device 110 may communicate with the terminal device 120 by using a multi-antenna technology.

The terminal device in embodiments of this application may communicate with one or more core networks by using a radio access network (RAN), and the terminal device may be referred to as an access terminal, user equipment (UE), a user unit, a user station, a mobile station, a mobile console, a remote station, a remote terminal, a mobile device, a user terminal, a terminal, a wireless communication device, a user agent, or a user apparatus. The access terminal may be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a future 5G network, a terminal device in a future evolved public land mobile network (PLMN), or the like.

The network device in embodiments of this application may be a device configured to communicate with the terminal device. The network device may be a base transceiver station (BTS) in a global system for mobile communications (GSM) system or a code division multiple access (CDMA) system, a NodeB (NB) in a wideband code division multiple access (WCDMA) system, an evolved NodeB (eNB or eNodeB) in an LTE system, or a radio controller in a cloud radio access network (CRAN) scenario. The network device may also be a relay station, an access point, a vehicle-mounted device, a roadside station, a wearable device, a network device in a future 5G network, a network device in a future evolved PLMN network, or the like. This is not limited in embodiments of this application. For example, the network device may be a gNB or a transmission point (TRP or TP) in an NR system, one antenna panel or a group of (including a plurality of antenna panels) antenna panels of a base station in a 5G system, or a network node forming the gNB or the transmission point, such as a baseband unit (BBU) or a distributed unit (DU).

In some deployments, the gNB may include a centralized unit (CU) and a DU. The gNB may further include a radio unit (RU). The CU is configured to implement a part of functions of the gNB and the DU is configured to implement a part of functions of the gNB. For example, the CU implements functions of a radio resource control (RRC) layer and a packet data convergence protocol (PDCP) layer, and the DU is configured to implement functions of a radio link control (RLC) layer, a media access control (MAC)

layer and a physical (PHY) layer. Because information about the RRC layer finally becomes information about the PHY layer, or is converted from the information about the PHY layer, in this architecture, higher layer signaling such as RRC layer signaling may also be considered to be sent by the DU, or sent by the DU and the CU together. It may be understood that the network device may be a CU node, a DU node, or a device including the CU node and the DU node. In addition, the CU may be classified as a network device in the radio access network (RAN), or the CU may be classified as a network device in the core network (CN). This is not limited in this application.

Alternatively, the network device may be a general term of all devices at a network end. For example, when a plurality of TRPs are used to transmit data to the terminal device, the plurality of TRPs may be collectively referred to as the network device.

In embodiments of this application, the terminal device or the network device includes a hardware layer, an operating system layer running above the hardware layer, and an application layer running above the operating system layer. The hardware layer includes hardware such as a central processing unit (CPU), a memory management unit (MMU), and a memory (also referred to as a main memory). The operating system may be any one or more computer operating systems that implement service processing by using a process, for example, a Linux operating system, a Unix operating system, an Android operating system, an iOS operating system, or a Windows operating system. The application layer includes applications such as a browser, an address book, word processing software, and instant messaging software. In addition, embodiments of this application do not particularly limit a specific structure of an entity for executing the method provided in embodiments of this application, provided that a program that records code of the method provided in embodiments of this application can be run, to perform communication according to the method provided in embodiments of this application. For example, the method provided in embodiments of this application may be performed by the terminal device or the network device, or may be performed by a function module that is in the terminal device or the network device and that can invoke and execute a program.

In addition, various embodiments or features of this application may be implemented as a method, an apparatus, or a product that uses standard programming and/or engineering technologies. The term "product" used in this application covers a computer program that may be accessed from any computer-readable component, carrier, or medium. For example, the computer-readable storage medium may include, but is not limited to, a magnetic storage device (for example, a hard disk, a floppy disk, or a magnetic tape), an optical disc (for example, a compact disc (CD), or a digital versatile disc (DVD)), and a smart card or a flash memory device (for example, an erasable programmable read-only memory (EPROM), a card, a stick, or a key driver). In addition, various storage media described in this specification may represent one or more devices and/or other machine-readable media configured to store information. The term "machine-readable media" may include but are not limited to a radio channel, and various other media that can store, contain, and/or carry instructions and/or data.

Embodiments of this application may be applicable to an LTE system, the Internet of vehicles, and a subsequent evolved system such as 5G, or may be applicable to another wireless communication system that uses various radio access technologies, for example, systems that use code division multiple access, frequency division multiple access, time division multiple access, orthogonal frequency division multiple access and single carrier frequency division multiple access technologies, particularly to a scenario in which channel information feedback is required and/or a two-stage precoding technology is applied, for example, a wireless network that uses a massive MIMO technology or a distributed antenna technology.

It should be understood that the multiple-input multiple-output (MIMO) technology means that a transmit end device and a receive end device respectively use a plurality of transmit antennas and receive antennas, so that signals are transmitted and received by using the plurality of antennas of the transmit end device and the receive end device. This improves communication quality. The technology can make full use of space resources, implement MIMO by using the plurality of antennas, and multiply a system channel capacity without increasing spectrum resources and antenna transmit power.

For ease of understanding, the following first describes related terms in embodiments of this application.

1. Control Channel Element (CCE)

The CCE is a basic physical unit of a PDCCH. That is, one PDCCH channel includes one or more CCEs. One CCE may include six resource element groups (REG). Each REG may include one RB, that is, 12 resource elements (RE), in frequency domain, and may include one orthogonal frequency division multiplexing (OFDM) symbol in time domain. A physical resource occupied by a control resource set (CORESET) determines a quantity of CCEs included in the CORESET. For example, one CORESET occupies 24 RBs and one OFDM symbol. In a possible implementation, the 24 RBs may be divided into four CCEs in a non-interleaved mapping manner and numbered, and each CCE includes six consecutive REGs. In another possible implementation, a plurality of inconsecutive REGs may form one CCE in an interleaved mapping manner. Herein, the CCE may be understood as a logical resource, and the REG may be understood as an actual resource. Interleaved or non-interleaved mapping from a logical resource to an actual resource may be performed.

2. Control Resource Set (CORESET)

The CORESET is a physical resource set configured by a network device and for carrying downlink control information (DCI). One CORESET is a physical resource including a plurality of CCEs or a plurality of REGs. For example, in frequency domain, a quantity of resource blocks (RB) that can be occupied by one CORESET is an integer multiple of 6, and is configured in a bitmap form. For example, one CORESET may be configured to occupy 12 RBs. In time domain, one CORESET may occupy one or more consecutive OFDM symbols. For example, one CORESET may be configured to occupy one to three consecutive OFDM symbols.

The CORESET is configured by using higher layer signaling. Generally, one transmission configuration indicator (TCI) may be configured for one CORESET through pre-defining or by performing configuration by the network device by using the higher layer signaling. In addition, a corresponding demodulation reference signal (DMRS) sequence or a scrambling sequence of a DCI bit may be further configured in the CORESET.

3. Search Space Set (SSS)

A terminal device may listen to one or more search space sets SSSs, to obtain corresponding DCI. An identifier of each search space set is associated with an identifier of one CORESET, so that the terminal device learns of physical resources occupied by each search space set. The SSS is used to specify a blind detection behavior of the terminal device. A meaning of DCI blind detection is as follows: In a physical resource pool (that is, a corresponding SSS) occupied by DCI, a DMRS is received on different resources according to a specific rule, channel estimation is performed, and signal detection and decoding are performed based on different DCI formats and scrambling manners.

One SSS may include the following configuration information:

(1) identifier (SSS ID) of the SSS (2) CORESET associated with the SSS

An SSS is associated with a CORESET, so that the terminal device can perform, based on a detection behavior defined by the SSS, blind detection on DCI on a physical resource corresponding to the associated CORESET. It should be understood that one CORESET may be associated with a plurality of SSSs, and one SSS is associated with one CORESET.

(3) Monitoring occasion

By configuring a monitoring period, an offset (for example, in a unit of a slot), and an OFDM symbol position (for example, may be indicated in a bitmap form) of the SSS, the terminal device may determine the DCI monitoring occasion. For example, if an SSS 1 is associated with a CORESET 1, the terminal device may determine a time domain position based on a monitoring occasion of the SSS 1, determine a frequency domain position based on the CORESET 1, and perform blind detection, at the determined time domain position and frequency domain position, on DCI corresponding to the SSS 1. The monitoring period may be configured as one slot or N OFDM symbols.

(4) Aggregation level (AL)

A frequency domain resource occupied by one piece of DCI includes n consecutive CCEs, where n may be referred to as an AL corresponding to the DCI. In other words, a value of an AL is a quantity of CCEs included in one piece of DCI, and candidate values of the AL may be {1, 2, 4, 8, 16}. Different ALs may adapt to different channel conditions. For example, when a signal to interference plus noise ratio (SINR) of a channel is low, the network device may send DCI at a large AL to improve transmission reliability. On the contrary, the network device may send DCI at a small AL to reduce resource overheads.

(5) Quantity of PDCCH candidates at each AL

After the network device configures an SSS and a CORESET for the terminal device, the terminal device may determine a time-frequency position of a PDCCH based on the configured SSS and the configured CORESET. The network device further needs to notify the terminal device of how to sequentially detect, at the time-frequency position, DCI that may be delivered, that is, how to perform blind detection. Therefore, the network device needs to notify, by configuring a PDCCH candidate, the terminal device of a size and a position of a physical resource corresponding to each time of DCI blind detection. The PDCCH candidate may be understood as a basic granularity of DCI blind detection performed by the terminal device. One PDCCH candidate corresponds to one time of DCI detection or one DCI detection process (performing operations such as information bit parsing, decoding, and determining). The quantity of the PDCCH candidates reflects complexity of detecting DCI by the terminal device. For example, Table 1 shows a correspondence between a subcarrier spacing and a quantity of PDCCH candidates. The network device may configure different PDCCH candidates based on different subcarrier spacings.

TABLE 1

| Subcarrier spacing (kHz) | Maximum quantity of detected PDCCH candidates |
|---|---|
| 15 | 44 |
| 30 | 36 |
| 60 | 22 |
| 120 | 20 |

The terminal device may determine, based on the value of the AL, a quantity of physical resources occupied by a PDCCH candidate at the AL, and determine physical resources occupied by each PDCCH candidate at the AL based on information such as an index value of each PDCCH candidate at the AL, an associated CORESET ID, and a quantity of CCEs included in the CORESET.

In addition, the SSS may further include information such as corresponding DCI format information and a radio network temporary identifier (RNTI), to indicate a manner in which the terminal device detects and parses DCI.

4. Transmission Configuration Indicator (TCI) State

The TCI state includes quasi co-location (QCL) assumption indication information, where the indication information indicates that a same QCL assumption exists between a reference signal (RS) and a DMRS of a PDCCH.

The foregoing quasi co-location relationship may be one of the following types:

Quasi co-location type A (QCL-Type A): includes a Doppler shift, a Doppler spread, an average delay, and a delay spread.

Quasi co-location type B (QCL-Type B): includes a Doppler shift and a Doppler spread.

Quasi co-location type C (QCL-Type C): includes an average delay and a delay spread.

Quasi co-location type D (QCL-Type D): includes a spatial receive parameter (spatial Rx parameter).

When an RS of a specific QCL type is configured for a TCI state in the CORESET, a DMRS in the CORESET and the RS have a same QCL assumption of the QCL type. Each CORESET can be independently configured with a TCI state.

5. DCI Format

The DCI format may include DCI format 1_0, DCI format 1_1, DCI format 1_2, DCI format 0_0, DCI format 0_1, DCI format 0_2, and the like. A quantity of bits corresponding to the DCI format 1_2 is less than a quantity of bits corresponding to the DCI format 1_0, for example, less than or equal to 10 bits to 16 bits. A quantity of bits corresponding to the DCI format 0_2 is less than a quantity of bits corresponding to the DCI format 0_0, for example, less than or equal to 10 bits to 16 bits. The following describes in detail a simplified DCI format, for example, the foregoing DCI format 1_2.

A feature of the simplified DCI format is that quantities of bits in most fields are configurable, for example, a field may be configured as a field with a small quantity of bits. In addition, a field (SLIV field) that is in the DCI and that indicates a time domain position for scheduling a PDSCH includes the following information: a position of a slot ($K_0$) in which the PDSCH is located; a length (L) of an OFDM symbol occupied by the PDSCH; and a start position (S) of an OFDM symbol occupied by the PDSCH in the corresponding slot. For example, one slot may include 7 OFDM symbols or 14 OFDM symbols, and an actual length of each OFDM symbol may be set according to requirements. A value indicated by $K_0$ indicates an offset of the slot in which the PDSCH is located relative to a slot in which the DCI is located. For example: $K_0=0$ indicates that the PDSCH and the DCI are located in a same slot.

In a common DCI format (for example, the foregoing DCI format 1_0), a reference start position indicated by S in the SLIV field is a start boundary of a slot (which may also be referred to as a start position of a slot slot). However, in the simplified DCI format, the reference start position indicated by S in the SLIV field is a start symbol position of a monitoring occasion of a corresponding PDCCH. This helps reduce DCI overheads and improve reliability of DCI transmission.

Figure 2:
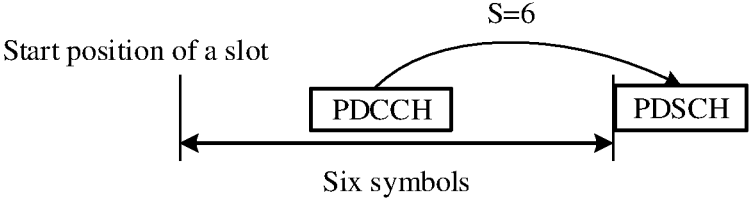
FIG. 2 is a schematic diagram of a start position of a PDSCH corresponding to a common DCI format.
Figure 3:
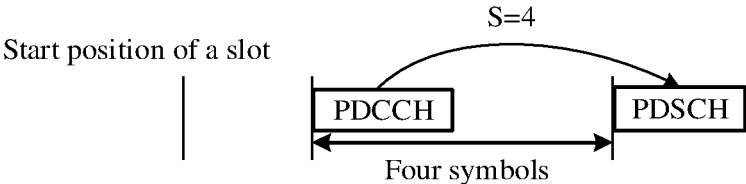
FIG. 3 is a schematic diagram of a start position of a PDSCH corresponding to a simplified DCI format.

It is assumed that $K_0=0$. The following provides an example for description with reference to FIG. 2 and FIG. 3. An example of the common DCI format is shown in FIG. 2. A time domain position of a PDCCH may be determined based on configuration information in a corresponding SSS (that is, a monitoring occasion of the SSS). When DCI is correctly detected, a terminal device may determine that S in an SLIV field is 6, where a value of S represents that a start position of a PDSCH is six OFDM symbols away from a start position of a slot. It is assumed that an index value of a start OFDM symbol of the slot is 0, the index value of the start position of the PDSCH is 6. In other words, the start position of the PDSCH is the seventh OFDM symbol in the slot. An example of the simplified DCI format is shown in FIG. 3. When a terminal device determines that S in an SLIV field is 4, a value of S represents that a start position for receiving the PDSCH is four OFDM symbols away from a start position of a monitoring occasion of a PDCCH that schedules the PDSCH. It is assumed that an index value of an OFDM symbol corresponding to the start position of the monitoring occasion of the PDCCH is 2, the index value of the start position of the PDSCH is 6. In other words, the start position of the PDSCH is the seventh OFDM symbol in the slot, and the monitoring occasion of the PDCCH may be determined by configuration information of a corresponding SSS.

As described above, one SSS may include one or more PDCCH candidates. That the terminal device performs blind detection on the PDCCH candidates may also be understood as that the terminal device performs blind detection in the SSS. One SSS may be associated with one CORESET, that is, one or more PDCCH candidates may be associated with one CORESET. The network device may separately send different DCI by using different CORESETs, and the terminal device may independently perform blind detection on PDCCH candidates associated with the CORESETs, to obtain DCI corresponding to each CORESET. The DCI obtained by the terminal device by using different CORESETs is independent of each other, and is not associated with each other.

To improve reliability of PDCCH transmission, in a current method, information bits of same DCI may be repeatedly transmitted on a plurality of physical resources (for example, the CORESETs). The terminal device may separately perform blind detection on the DCI on the plurality of physical resources, and combine the obtained information bits to improve reliability for information detection. For example, to obtain a diversity gain of a channel, one SSS may be associated with at least two CORESETs, and different TCI states may be configured for different CORESETs. The network device may repeatedly deliver the DCI on the at least two CORESETS, and the terminal device may combine DCI obtained by using the at least two CORESETs to obtain final DCI. However, because a monitoring occasion is configured for the SSS, when one SSS is associated with at least two CORESETs, monitoring occasions of the at least two CORESETs are the same. In this case, DCI is sent at a same moment, leading to poor flexibility of delivering the DCI by the network device. In view of this, embodiments of this application provides a data transmission method and apparatus, to help improve flexibility of delivering DCI by a network device, and improve data transmission efficiency.

Before the method provided in embodiments of this application is described, the following descriptions are first provided.

First, in embodiments of this application, "pre-defining" may be implemented by pre-storing corresponding code, a table, or another manner that may be indicate related information in a device (for example, including a terminal device and a network device). A specific implementation is not limited in this application.

Second, in embodiments shown below, terms and English acronyms and abbreviations, such as a control resource set (CORESET), a search space set (SSS), and a PDCCH candidate are all examples provided for ease of description, and shall not constitute any limitation on this application. This application does not exclude a possibility of defining another term that can implement a same or similar function in an existing or future protocol.

Third, "first", "second", and various digital sequence numbers in embodiments shown below are merely used for differentiation for ease of description, and are not used to limit the scope of embodiments of this application, for example, used for differentiation between different fields and different information.

Fourth, a "protocol" in embodiments of this application may be a standard protocol in the communication field, for example, may include an LTE protocol, an NR protocol, and a related protocol applied to a future communication system. This is not limited in this application.

Fifth, "at least one" means one or more, and "at least two" and "a plurality of" means two or more. The term "and/or" describes an association relationship for describing associated objects and represents that three relationships may exist. For example, A and/or B may represent the following cases: Only A exists, both A and B exist, and only B exists, where A and B may be singular or plural. The character "/" generally indicates a kind of "or" relationship between the associated objects. The term "at least one (one piece) of the following" or a similar expression thereof means any combination of these items, including any combination of a singular item (piece) or plural items (pieces). For example, at least one of a, b, and c may indicate: a, or b, or c, a and b, a and c, b and c, or a, b, and c, where a, b, and c may be singular or plural.

The following describes in detail a data transmission method and apparatus provided in this application with reference to the accompanying drawings. It should be understood that the technical solutions of this application may be applied to a wireless communication system, for example, the communication system 100 shown in FIG. 1. There may be a wireless communication connection relationship between two communication apparatuses in the wireless communication system. One of the two communication apparatuses may correspond to the terminal device 120 shown in FIG. 1, for example, may be the terminal device shown in FIG. 1, or may be a chip disposed in the terminal device. The other communication apparatus in the two communication apparatuses may correspond to the network device 110 shown in FIG. 1, for example, may be the network device shown in FIG. 1, or may be a chip disposed in the network device.

Figure 4:
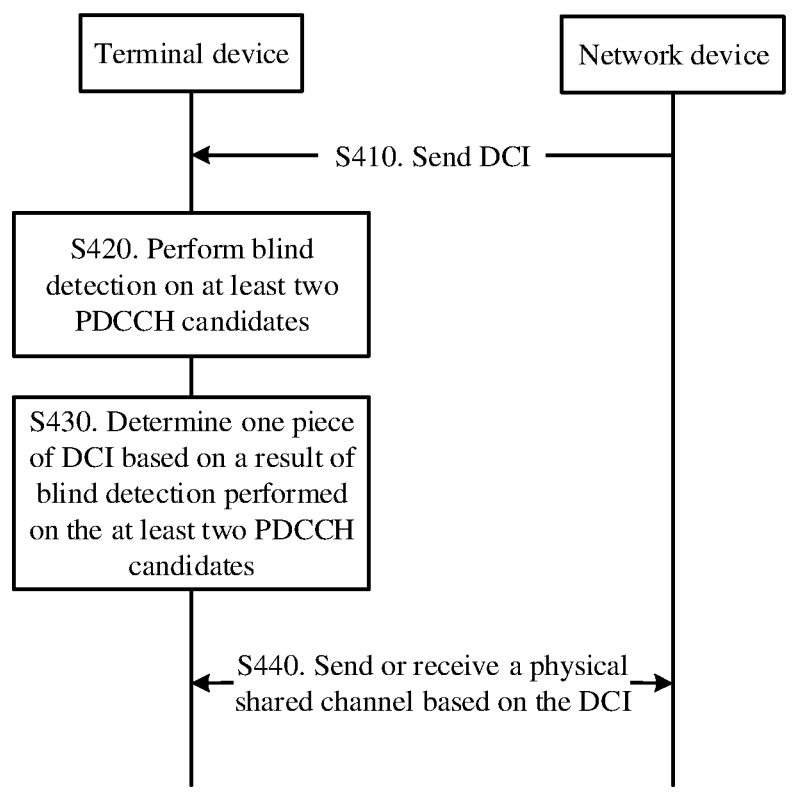
FIG. 4 is a schematic flowchart of a data transmission method according to an embodiment of this application.

FIG. 4 is a schematic flowchart of a data transmission method 400 according to an embodiment of this application. The method may be applied to the communication system shown in FIG. 1. However, this is not limited in this embodiment of this application. The method 400 includes the following steps.

S410. A network device sends DCI by using a part or all of at least two PDCCH candidates, where the DCI is configured to schedule a physical shared channel. Correspondingly, a terminal device performs blind detection on the at least two physical downlink control channel PDCCH candidates, where the at least two PDCCH candidates are associated with different control resource sets CORESETs, and an association relationship exists between the at least two PDCCH candidates.

In embodiments of this application, "an association relationship exists between the PDCCH candidates" means that the terminal device needs to obtain DCI signaling based on a plurality of PDCCH candidates that have an association relationship, where the DCI signaling may be used to schedule at least one PUSCH or at least one PDSCH. It should be understood that the at least two PDCCH candidates belong to different SSSs.

Optionally, an alternative manner in which the at least two PDCCH candidates are associated with different control resource sets CORESETs is: The at least two PDCCH candidates may be associated with at least two TCI states configured in a same CORESET.

S420. The terminal device determines the piece of DCI based on a result of blind detection performed on the at least two PDCCH candidates.

The result of blind detection may be a soft information value, a modulation symbol, a demodulated information bit, a sequence, or the like obtained by the terminal device through blind detection. This is not limited in embodiments of this application.

S430. The network device sends or receives the physical shared channel based on the DCI. Correspondingly, the terminal device receives or sends the physical shared channel based on the DCI.

According to the data transmission method in embodiments of this application, the association relationship between the at least two PDCCH candidates is configured, where the at least two PDCCH candidates belong to different SSSs, and the at least two PDCCH candidates are associated with different CORESETs. In this way, the at least two PDCCH candidates that have the association relationship may be received by using different QCL assumptions, and monitoring occasions may be independently configured for different SSSs corresponding to the at least two PDCCH candidates. This helps improve flexibility of delivering DCI by the network device, reduce complexity of receiving the DCI by the terminal device, and improve data transmission efficiency.

The physical shared channel herein may be a physical uplink shared channel (PUSCH), or may be a physical downlink shared channel (PDSCH). This is not limited in embodiments of this application. If the physical shared channel is a PUSCH, the terminal device may send the PUSCH based on the DCI, and the network device may receive the PUSCH based on the DCI. If the physical shared channel is a PDSCH, the network device may send the PDSCH based on the DCI, and the terminal device may receive the PDSCH based on the DCI.

The at least two PDCCH candidates may belong to different SSSs. For example, five PDCCH candidates belong to two SSSs (including an SSS 1 and an SSS 2), where three PDCCH candidates belong to the SSS 1, and two PDCCH candidates belong to the SSS 2. For another example, the three PDCCH candidates separately belong to three different SSSs. That an association relationship exists between the at least two PDCCH candidates may also be understood as that an association relationship exists between SSSs corresponding to the at least two PDCCHs. Similarly, that the at least two PDCCH candidates are associated with different CORE-SETs may also be understood as that at least two SSSs corresponding to the at least two PDCCH candidates are associated with different CORESETs. The terminal device may separately determine at least two monitoring occasions based on the at least two SSSs, and then determine, based on the CORESETs associated with the SSSs, a physical resource position for detecting the DCI. For example, the SSS 1 includes a PDCCH candidate 1, the SSS 2 includes a PDCCH candidate 2, and an association relationship exists between the SSS 1 and the SSS 2. That is, an association relationship exists between the PDCCH candidate 1 and the PDCCH candidate 2. The SSS 1 may be associated with a CORESET #1, and the SSS 2 may be associated with a CORESET #2. The terminal device may determine a monitoring occasion 1 based on the SSS 1, determine a monitoring occasion 2 based on the SSS 2, and further separately determine, based on the CORESET #1 and the CORESET #2, the physical resource position for detecting the DCI.

In embodiments of this application, the association relationship exists between the at least two PDCCH candidates. The association relationship may be agreed on in advance, or may be configured by the network device for the terminal device by using signaling. For example, the network device may configure the association relationship for the terminal device by using a system message, a dedicated RRC message, MAC layer signaling, or physical layer signaling. This is not limited in embodiments of this application. For example, if the association relationship is agreed on in advance, the network device and the terminal device may directly determine the association relationship between the at least two PDCCH candidates according to a pre-defined association rule. If the association relationship is configured by the network device, the network device may directly group the PDCCH candidates by using signaling, and PDCCH candidates in a same group have an association relationship. Alternatively, the network device may configure an association rule, so that the terminal device determines a relationship between the at least two PDCCH candidates according to the association rule. However, it should be understood that, that an association relationship exists between the at least two PDCCH candidates only indicates that information bits sent on the at least two PDCCH candidates are in same DCI, but does not mean that the network device definitely sends the DCI on the at least two PDCCH candidates. For the network device, the network device may send the DCI on one or more PDCCH candidates in the at least two PDCCH candidates that have the association relationship. For the terminal device, the terminal device needs to perform blind detection on the at least two PDCCH candidates that have the association relationship, and determine DCI based on a result of blind detection performed on the at least two PDCCH candidates. In other words, information bits on PDCCH candidates that have an association relationship also have an association relationship, and are used by the terminal device to determine DCI.

Specifically, that an association relationship exists between the at least two PDCCH candidates indicates that there is an association between information bits obtained by performing blind detection on the at least two PDCCH candidates, or there is an association between blind detection operations performed on the at least two PDCCH candidates.

In embodiments of this application, information bits on all PDCCH candidates that have an association relationship form or include all information bits of the DCI.

In a first possible implementation, the information bits on the at least two PDCCH candidates each include all the information bits of the DCI. For example, DCI signaling includes X bits, where X is a positive integer, and the X bits may be a sequence, modulation symbols obtained through coding and modulation, or the like. The X bits may undergo a same coding and modulation scheme or different coding and modulation schemes, and each of the at least two PDCCH candidates carries the X bits. The terminal device may separately receive the information bits on the at least two PDCCH candidates, separately perform maximum likelihood detection and soft decision, and perform soft combination on obtained two soft information bits, to obtain the final DCI. In this embodiment, a probability of correct detection can be improved in a soft combination process, and then reliability of DCI detection is improved. In addition, two pieces of DCI information are separately transmitted through channels with low correlation, so that a gain of a soft combination operation can be increased, and robustness is better.

In a second possible implementation, the information bits on the at least two PDCCH candidates each include a part of the information bits of the DCI. The part of information bits herein may be any part of information bits of DCI signaling. For two PDCCH candidates, that is, the at least two PDCCH candidates are a PDCCH candidate 1 and a PDCCH candidate 2, for example, the network device may add, to the PDCCH candidate 1, a part of modulation symbols of obtained by performing coding and modulation on a DCI signaling bit string, and add remaining modulation symbols different from the part of modulation symbols to the PDCCH candidate 2. For another example, the network device may add, to the PDCCH candidate 1, a part of modulation symbols obtained by performing independent coding and modulation on a part of a DCI signaling bit string, and add remaining modulation symbols obtained by performing independent coding and demodulation on a remaining part of modulation symbols different from the part of modulation symbols to the PDCCH candidate 2. For example, the network device may transmit first 10 bits of DCI signaling by using the PDCCH candidate 1, and transmit last 20 bits of the DCI signaling by using the PDCCH candidate 2. In other words, the network device may add information bits of DCI signaling to at least two CORESETs, and send signals carried on different CORESETs by using different TRPs. The terminal device may separately receive the information bits on the at least two PDCCH candidates, separately perform detection, and obtain final DCI based on obtained at least two pieces of information. In this embodiment, it may be understood that, at least two PDCCH candidates at a small AL may be aggregated to form a PDCCH candidate at a large AL, for example, two PDCCH candidates at an AL of 4 may form a PDCCH candidate at an AL of 8. The DCI signaling in this embodiment has low channel correlation in a transmission process, and has a diversity gain. Compared with the foregoing first possible implementation, complexity of blind detection performed by the terminal device in this implementation is lower.

Which implementation in the foregoing two possible implementations is specifically used may be agreed on in advance, or may be configured by the network device for the terminal device by using signaling. For example, the network device may configure the association relationship for the terminal device by using a system message, a dedicated RRC message, MAC layer signaling, or physical layer signaling. This is not limited in embodiments of this application.

It should be understood that a process in which the terminal device obtains DCI signaling on the at least two PDCCH candidates may include a plurality of implementations. For example, the terminal device may first perform decoding, and then combine decoded information bits. Alternatively, the terminal device may first combine detected information, and then perform decoding to obtain final information bits. This is not limited in embodiments of this application.

Figure 5:
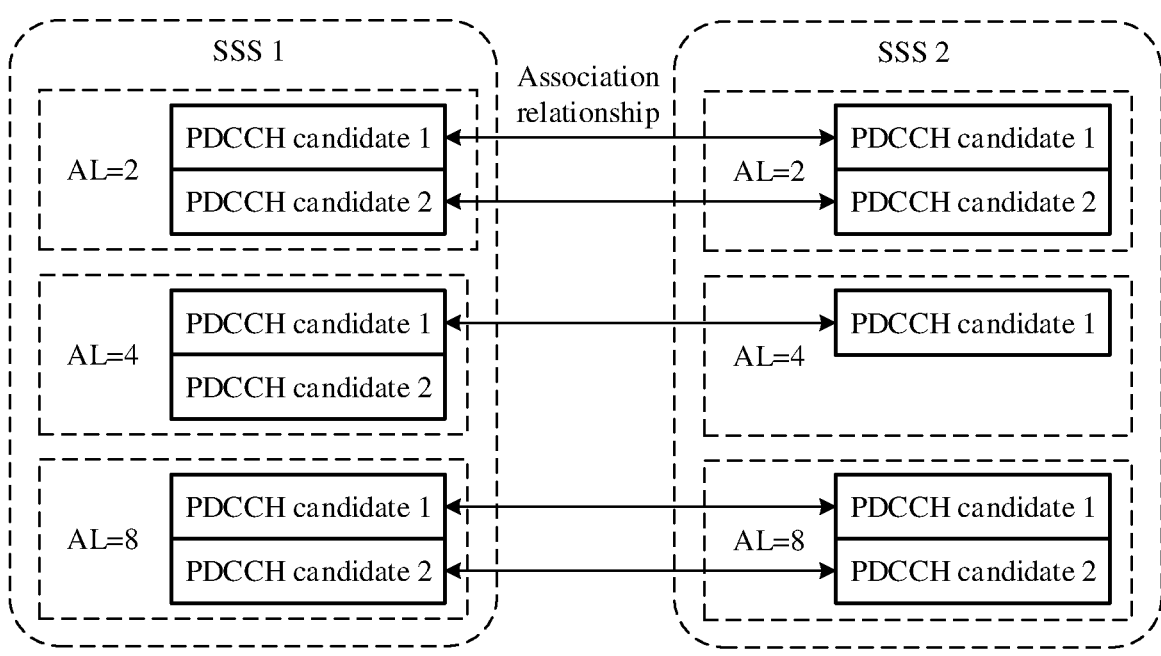
FIG. 5 is a schematic diagram of an association relationship between PDCCH candidates according to an embodiment of this application.
Figure 6:
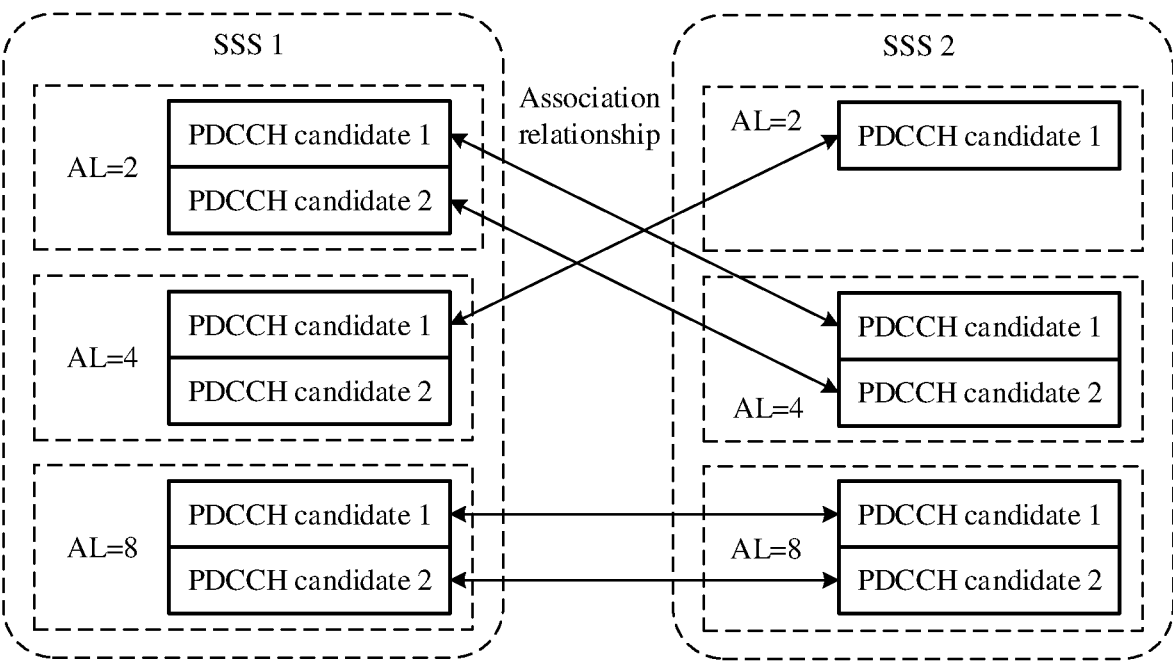
FIG. 6 is another schematic diagram of an association relationship between PDCCH candidates according to an embodiment of this application.
Figure 7:
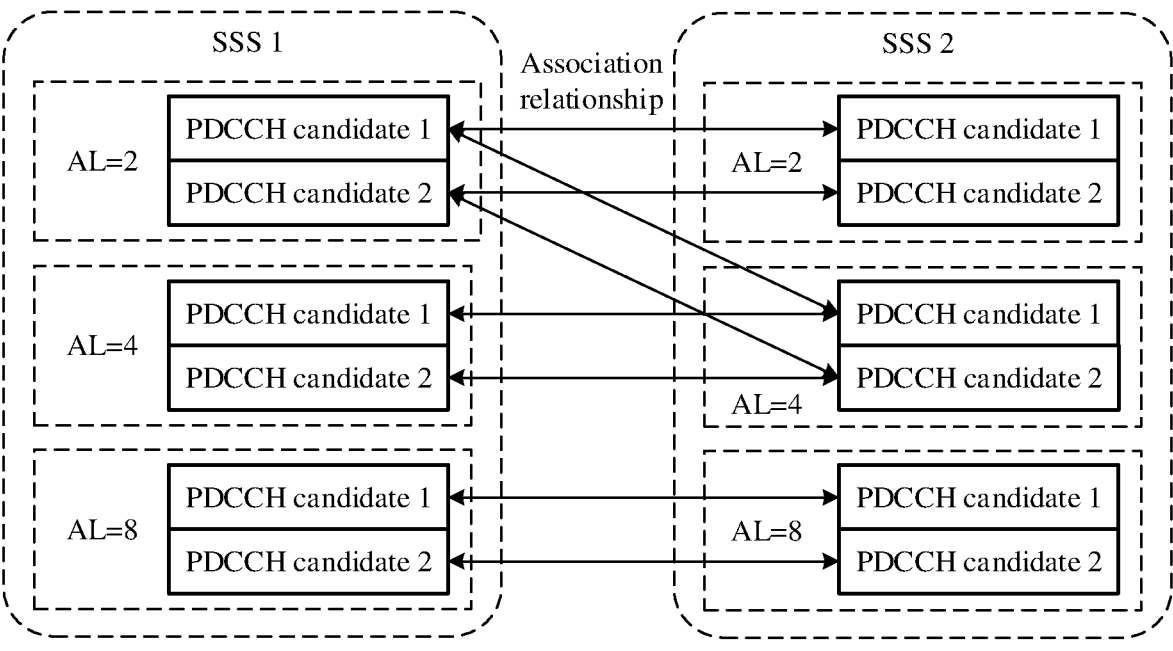
FIG. 7 is still another schematic diagram of an association relationship between PDCCH candidates according to an embodiment of this application.

Because a PDCCH candidate belongs to an SSS, an association relationship between the at least two PDCCH candidates may also be essentially understood as an association relationship between PDCCH candidates in different SSSs. For example, an association relationship may be configured or agreed between a PDCCH candidate of an SSS 1 and a PDCCH candidate of an SSS 2. Further, an association relationship may be configured or agreed between one or more PDCCH candidates of the SSS 1 and one or more PDCCH candidates of the SSS 2. With reference to FIG. 5 to FIG. 7, the following describes in detail the association relationship between the at least two PDCCH candidates.

In a possible implementation, the at least two PDCCH candidates have a same AL and a same sequence number. That is, an association relationship may be agreed on in advance between the PDCCH candidates with the same sequence number and at the same AL. The sequence number herein is at an AL level, that is, the PDCCH candidates are numbered at a same AL in a same SSS. For example, PDCCH candidates with different sequence numbers at a same AL may include non-overlapping time-frequency resource elements, for example, CCEs. In this embodiment, after performing blind detection, the terminal device may perform a soft combination operation on information bits corresponding to the PDCCH candidates with a same sequence number at a same AL or combine decoded information bits. It should be understood that PDCCH candidates that have no association relationship do not belong to the at least two PDCCH candidates, and the terminal device may independently perform the blind detection operation, for example, parsing or decoding, on the PDCCH candidates.

Two SSSs are used as an example. As shown in FIG. 5, an association relationship exists between a PDCCH candidate 1 at an AL of 2 in an SSS 1 and a PDCCH candidate 1 at an AL of 2 in an SSS 2, and an association relationship exists between a PDCCH candidate 2 at the AL of 2 in the SSS 1 and a PDCCH candidate 2 at the AL of 2 in the SSS 2, an association relationship exists between a PDCCH candidate 1 at an AL of 4 in the SSS 1 and a PDCCH candidate 1 at an AL of 4 in the SSS 2, an association relationship exists between a PDCCH candidate 1 at an AL of 8 in the SSS 1 and a PDCCH candidate 1 at an AL of 8 in the SSS 2, and an association relationship exists between a PDCCH candidate 2 at the AL of 8 in the SSS 1 and a PDCCH candidate 2 at the AL of 8 in the SSS 2. The terminal device may combine blind detection results on PDCCH candidates that have an association relationship. In FIG. 5, because only the PDCCH candidate 1 at the AL of 4 is included in the SSS 2, according to the foregoing rule, there is no PDCCH candidate having an association relationship with a PDCCH candidate 2 at the AL of 4 in the SSS 1. The terminal device may independently perform blind detection on the PDCCH candidate 2 at the AL of 4 in the SSS 1.

In this embodiment of this application, the terminal device performs the soft combination operation on PDCCH candidates at a same AL, so that processing complexity for the terminal device can be reduced. In addition, a one-to-one association relationship may exist between the PDCCH candidates, or an association relationship exists between only a part of PDCCH candidates in different SSSs, so that processing complexity for the terminal device can be further reduced.

In another possible implementation, the at least two PDCCH candidates have different ALs and a same sequence number. That is, an association relationship exists between PDCCH candidates with the same sequence number at a specific AL (pre-defined or configured). The foregoing sequence number is at an AL level, that is, the PDCCH candidates are numbered at a same AL in a same SSS. The foregoing different ALs may be agreed on in advance or configured by the network device. In this embodiment, after performing blind detection, the terminal device may perform a soft combination operation on information bits corresponding to the PDCCH candidates with the same sequence number at the specific AL (pre-defined or configured) or combine decoded information bits. It should be understood that PDCCH candidates that have no association relationship do not belong to the at least two PDCCH candidates, and the terminal device may independently perform the blind detection operation, for example, parsing or decoding, on the PDCCH candidates.

That an association relationship exists between the PDCCH candidates with the same sequence number at a specific AL (pre-defined or configured) may be classified into the following two cases:

Case 1: There is a one-to-one relationship between ALs, that is, an association relationship exists between a PDCCH candidate at one AL and a PDCCH candidate at another AL.

Two SSSs are used as an example. As shown in FIG. 6, an association relationship exists between a PDCCH candidate 1 at an AL of 2 in an SSS 1 and a PDCCH candidate 1 at an AL of 4 in an SSS 2, and an association relationship exists between a PDCCH candidate 2 at the AL of 2 in the SSS 1 and a PDCCH candidate 2 at the AL of 4 in the SSS 2, an association relationship exists between a PDCCH candidate 1 at an AL of 4 in the SSS 1 and a PDCCH candidate 1 at an AL of 2 in the SSS 2, an association relationship exists between a PDCCH candidate 1 at an AL of 8 in the SSS 1 and a PDCCH candidate 1 at an AL of 8 in the SSS 2, and an association relationship exists between a PDCCH candidate 2 at the AL of 8 in the SSS 1 and a PDCCH candidate 2 at the AL of 8 in the SSS 2. The terminal device may combine blind detection results on PDCCH candidates that have an association relationship. In FIG. 6, because only the PDCCH candidate 1 at the AL of 2 is included in the SSS 2, according to the foregoing rule, there is no PDCCH candidate having an association relationship with a PDCCH candidate 2 at the AL of 4 in the SSS 1. The terminal device may independently perform blind detection on the PDCCH candidate 2 at the AL of 4 in the SSS 1.

In this embodiment of this application, because channels of different TRPs are different, the at least two PDCCH candidates that have the association relationship are configured to have different ALs, so that different ALs can be configured for different TRPs based on channel conditions to send DCI. Flexibility is high. In addition, there is a one-to-one association relationship between PDCCH candidates, so that processing complexity for the terminal device can be further reduced.

Case 2: There is a one-to-many relationship between ALs, that is, an association relationship exists between a PDCCH candidate at one AL and PDCCH candidates at least two ALs.

Two SSSs are used as an example. As shown in FIG. 7, an association relationship exists between a PDCCH candidate 1 at an AL of 2 in an SSS 1 and a PDCCH candidate 1 at an AL of 2 in an SSS 2 and a PDCCH candidate 1 at an AL of 4 in the SSS 2, an association relationship exists between a PDCCH candidate 2 at the AL of 2 in the SSS 1 and a PDCCH candidate 2 at the AL of 2 in the SSS 2 and a PDCCH candidate 2 at the AL of 4 in the SSS 2, an association relationship exists between a PDCCH candidate 1 at an AL of 4 in the SSS 1 and the PDCCH candidate 1 at the AL of 4 in the SSS 2, an association relationship exists between a PDCCH candidate 2 at the AL of 4 in the SSS 1 and the PDCCH candidate 2 at the AL of 4 in the SSS 2, an association relationship exists between a PDCCH candidate 1 at an AL of 8 in the SSS 1 and a PDCCH candidate 1 at an AL of 8 in the SSS 2, and an association relationship exists between a PDCCH candidate 2 at the AL of 8 in the SSS 1 and a PDCCH candidate 2 at the AL of 8 in the SSS 2. The terminal device may combine blind detection results on PDCCH candidates that have an association relationship.

In this embodiment of this application, because channels of different TRPs are different, the at least two PDCCH candidates that have the association relationship are configured to have different ALs, so that different ALs can be configured for different TRPs based on channel conditions to send DCI. Flexibility of delivering DCI by the network device is improved.

Because in the foregoing simplified DCI format, the reference position indicated by S is the start symbol of the monitoring occasion of the PDCCH, when the network device repeatedly transmits the DCI by using the foregoing different CORESETs according to the simplified DCI format, there may be a plurality of reference positions indicated by S in the DCI. In addition, because original bits included in the repeatedly transmitted DCI are the same, the repeatedly transmitted DCI indicates a same S value. If all DCI in the at least two SSSs is correctly received by the terminal device, the terminal device may determine different start positions of the physical shared channel based on different reference positions. If only DCI in the at least two SSSs is correctly received by the terminal device, a start position that is of the physical shared channel and that is determined by the terminal device when DCI in one SSS is correctly received is different from a start position that is of the physical shared channel and that is determined by the terminal device when DCI in another SSS is correctly received, but the network device determines only one position of the physical shared channel. As a result, the terminal device and the network device have different understandings of the start position of the physical shared channel, affecting data receiving efficiency.

Therefore, optionally, before the network device sends the downlink control information DCI on the at least two physical downlink control channel PDCCH candidates, the method further includes: The network device determines a reference position, where the reference position is determined based on at least one CORESET in at least two CORESETs or at least one PDCCH candidate in the at least two PDCCH candidates. The network device determines a start position of the physical shared channel based on the reference position. Correspondingly, the terminal device determines a reference position, and the terminal device determines a start position of the physical shared channel based on the reference position. That the network device sends or receives the physical shared channel based on the DCI includes: The network device sends or receives the physical shared channel based on the start position. That the terminal device receives or sends the physical shared channel based on the DCI includes: The terminal device receives or sends the physical shared channel based on the start position of the physical shared channel.

The reference position may be determined based on at least one SSS in the at least two SSSs that have an association relationship, or determined based on at least one PDCCH candidate in the at least two PDCCH candidates that have the association relationship. Specifically, the network device and the terminal device may determine the reference position through agreement in a protocol according to an agreed rule, and then determine the start position of the physical shared channel.

In this embodiment of this application, when the network device indicates a DCI format of S by using a start position of the monitoring occasion of a PDCCH as the reference position, the terminal device may determine an actual start position of the physical shared channel according to the agreed rule, to ensure that the start position is consistent with an actual start position of the physical shared channel delivered by the network device. This helps improve efficiency of monitoring and receiving the physical shared channel.

In a possible implementation, the reference position is a reference position determined based on a CORESET in the at least two CORESETs or a PDCCH candidate in the at least two PDCCH candidates. Therefore, the network device and the terminal device may determine the start position of the physical shared channel based on the reference position.

Optionally, that the network device sends or receives the physical shared channel based on the start position of the physical shared channel includes: The network device determines a first field in the DCI and the start position of the physical shared channel based on the reference position. That the terminal device determines the start position of the physical shared channel based on the reference position includes: The terminal device determines the start position of the physical shared channel based on the reference position and the first field in the DCI, where the first field indicates an offset of the start position of the physical shared channel relative to the reference position.

In embodiments of this application, the DCI is in a simplified DCI format, and the terminal device determines only one reference position. Specifically, it is agreed in a protocol that a start position of a monitoring occasion of a specific SSS is used as the reference position. The network device may determine, according to the rule, the actual position of the physical shared channel and a first field in DCI delivered in the at least two SSSs that have the association relationship. The terminal device may determine a reference position according to the rule, and determine the start position of the physical shared channel based on the reference position and the first field in the DCI obtained through blind detection. The first field herein may be a field (that is, the SLIV field) to which S belongs.

For example, it may be agreed that a start symbol position of a monitoring occasion of an SSS corresponding to a CORESET with a largest sequence number or a smallest sequence number in the at least two CORESETs is the reference position.

For example, it may be agreed that a start symbol position of a monitoring occasion of an SSS corresponding to a PDCCH candidate with a largest sequence number or a smallest sequence number in the at least two PDCCH candidates is the reference position.

For example, it may be agreed that a start symbol position of a monitoring occasion of an SSS with a largest sequence number or a smallest sequence number in the at least two SSSs is the reference position.

For example, it may be agreed that a start symbol position of a monitoring occasion of an SSS corresponding to a PDCCH candidate with a foremost time domain position or a rearmost time domain position in the at least two PDCCH candidates is the reference position.

It should be understood that the largest sequence number or the smallest sequence number is merely an example, and should not limit the protection scope of embodiments of this application. In another possible implementation, in the at least two CORESETs (the at least two PDCCH candidates or the at least two SSSs), a start symbol position of a monitoring occasion of an SSS corresponding to a CORESET (a PDCCH candidate or an SSS) whose sequence number is in the middle, is the last but one largest, or is the last but one smallest may be used as the reference position. This is not limited in embodiments of this application.

It should be further understood that in subsequent examples of this embodiment of this application, it is assumed that $K_0=0$, that is, the physical shared channel and the DCI are located in a same slot. In actual application, the terminal device further needs to determine the start position of the physical shared channel based on the reference position, the first field, and $K_0$. Details are not described herein again.

Figure 8:
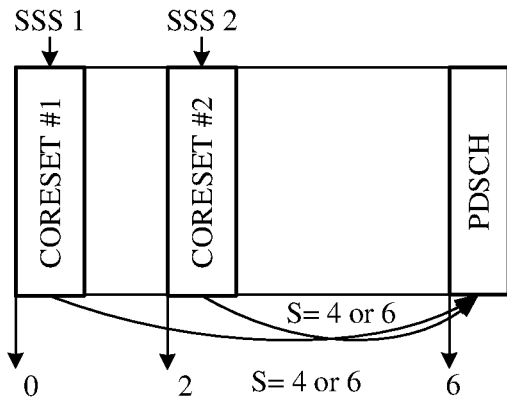
FIG. 8 is a schematic diagram of a start position of a PDSCH according to an embodiment of this application.

For example, the physical shared channel is a PDSCH. FIG. 8 is a schematic diagram of a start position of the PDSCH. In FIG. 8, an association relationship exists between an SSS 1 and an SSS 2. It is assumed that as agreed in a protocol, a start symbol position of a monitoring occasion of an SSS with a smaller sequence number is used as the reference position. Because the SSS 1 is the SSS with the smaller sequence number in the two SSSs that have the association relationship, the network device may determine S of DCI in the SSS 1 and S of DCI in the SSS 2 based on a monitoring occasion of the SSS 1, where the DCI in the SSS 1 and the DCI in the SSS 2 indicate a same S value, for example, S=6, and determine the start position of the PDSCH based on a start position of the monitoring occasion of the SSS 1 and S=6. The terminal device may determine an actual position of the PDSCH based on the foregoing rule and a detected S value in the DCI. It is assumed that in FIG. 8, even if the terminal device detects the DCI only in the SSS 2 and S=6, the terminal device may determine that the start position of the PDSCH still uses the start position of the monitoring occasion corresponding to the SSS 2 as the reference position, so that the determined start position of the PDSCH is 6.

In FIG. 8, it is assumed that as agreed in a protocol, a start symbol position of a monitoring occasion of an SSS with a larger sequence number is used as the reference position. Because the SSS 2 is the SSS with the larger sequence number in the two SSSs that have the association relationship, the network device may determine S of DCI in the SSS 1 and S of DCI in the SSS 2 based on a monitoring occasion of the SSS 2, where the DCI in the SSS 1 and the DCI in the SSS 2 indicate a same S value, for example, S=4, and determine the start position of the PDSCH based on a start position of the monitoring occasion of the SSS 2 and S=4. The terminal device may determine an actual position of the PDSCH based on the foregoing rule and a detected S value in the DCI. It is assumed that in FIG. 8, even if the terminal device detects the DCI only in the SSS 1 and S=4, the terminal device may determine that the start position of the PDSCH still uses the start position of the monitoring occasion corresponding to the SSS 1 as the reference position, so that the determined start position of the PDSCH is 6.

In embodiments of this application, it may be understood as that the at least two SSSs are used as an entirety that has a monitoring occasion, that is, a start position of the monitoring occasion of the entirety is used as the reference position. As agreed in a protocol, a start position of a monitoring occasion corresponding to an SSS with a smallest sequence number in SSSs that have an association relationship is used as the reference position, so that the terminal device can be prevented from receiving a PDSCH at an incorrect time point, thereby improving data receiving efficiency.

In another possible implementation, the reference position is at least two reference positions determined based on start symbol positions of monitoring occasions corresponding to the at least two CORESETs or the at least two PDCCH candidates. Therefore, the network device and the terminal device may determine the start position of the physical shared channel based on the at least two reference positions.

Optionally, that the network device sends or receives the physical shared channel based on the start position of the physical shared channel includes: The network device determines a first field in the DCI and at least two start positions based on the at least two reference positions. That the terminal device determines the start position of the physical shared channel based on the reference position includes: The terminal device determines at least two start positions based on the at least two reference positions and a first field in the DCI, where the first field indicates offsets of the at least two start positions relative to the at least two reference positions.

In this embodiment of this application, the DCI is in a simplified DCI format, and the terminal device may determine the at least two reference positions, that is, determine one reference position for each CORESET or each PDCCH candidate. Specifically, the network device may deliver a same original bit of the DCI on the at least two SSSs, the terminal device may separately determine the at least two reference positions based on monitoring occasions corresponding to the at least two SSSs, and the terminal device may determine the at least two start positions based on the at least two reference positions and the first field in the DCI obtained through blind detection, to receive or send at least two physical shared channels at the at least two start positions. The first field herein may be a field (that is, the SLIV field) to which S belongs.

Optionally, the at least two physical shared channels are at least two times of repeated transmission of a same transmission block (TB). This means that the terminal device may combine soft information received on the at least two physical shared channels, to improve transmission reliability on the physical shared channels.

Optionally, frequency domain resources occupied by the two times of repeated transmission may be determined based on an indication of a same piece of DCI signaling, that is, frequency domain resources occupied by the two times of repeated transmission are the same. Alternatively, a frequency domain interval between the second time of repeated transmission and the first time of repeated transmission may be pre-configured or pre-defined, so that the two times of repeated transmission occupy different frequency domain resources. This improves a frequency diversity gain of transmission.

Optionally, QCL assumptions used for the foregoing two times of repeated transmission are different. In an implementation, the QCL assumptions used for the foregoing two times of repeated transmission are the same as QCL assumptions used for two CORESETs for scheduling the repeated transmission.

Figure 9:
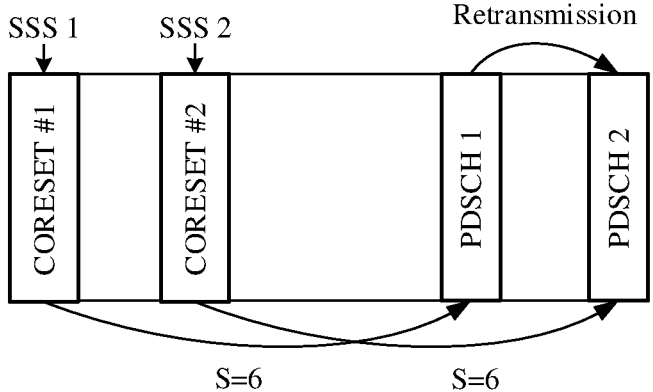
FIG. 9 is another schematic diagram of a start position of a PDSCH according to an embodiment of this application.

For example, the physical shared channel is a PDSCH. FIG. 9 is another schematic diagram of a start position of a PDSCH. In FIG. 9, an association relationship exists between an SSS 1 and an SSS 2. The network device repeatedly transmits DCI by using a CORESET #1 and a CORESET #2 that are corresponding to the SSS 1 and the SSS 2. Because the repeatedly transmitted DCI includes same original bits, S of the repeatedly transmitted DCI is equal to 6. The terminal device receives the repeatedly transmitted DCI, may determine a reference position 1 based on a monitoring occasion of the SSS 1, may determine a reference position 2 based on a monitoring occasion of the SSS 2, and then determines, based on S=6, two start positions shown in the figure: a start position of a PDSCH 1 and a start position of a PDSCH 2, to separately receive the PDSCH 1 and the PDSCH 2 at the corresponding positions. The terminal device may obtain a final PDSCH by combining the PDSCH 1 and the PDSCH 2.

As an optional implementation, the first field indicates at least two S values (which also may be referred to as at least two second fields), where the at least two S values separately have a correspondence with at least two CORESETs or at least two PDCCH candidates, and the at least two S values indicate the offsets of the at least two start positions relative to the at least two reference positions. That the network device determines a first field in the DCI and at least two start positions based on the at least two reference positions includes: The network device determines the at least two S values and the at least two start positions based on the at least two reference positions. That the terminal device determines at least two start positions based on the at least two reference positions and a first field in the DCI includes: The terminal device determines the at least two start positions based on the at least two reference positions and the at least two S values.

In this embodiment of this application, a quantity of S values indicated by the first field is determined based on a quantity of CORESETs (or SSSs) that have an association relationship. The terminal device may separately determine the corresponding start positions based on the at least two reference positions and the corresponding at least two S values. For example, in FIG. 9, it is assumed that the first field includes two values: S=8 and S=11, where S=8 corresponds to the SSS 1, and S=ii corresponds to the SSS 2. In this case, the terminal device may determine, based on the reference position 1 and S=8, a start position of the PDSCH 1 scheduled by using the DCI in the SSS 1, and determine, based on the reference position 2 and S=11, a start position of the PDSCH 2 scheduled by using the DCI in the SSS 2.

In this embodiment of this application, a plurality of monitoring occasions may be determined based on a plurality of SSSs that have an association relationship to determine a plurality of start positions, to repeatedly transmit a plurality of physical shared channels based on the plurality of start positions. This improves transmission reliability on the physical shared channels.

In an optional embodiment, the monitoring occasions corresponding to the at least two PDCCH candidates have a same start symbol position or a same end symbol position, or the monitoring occasions totally overlap.

In this embodiment of this application, start symbol positions or end symbol positions of monitoring occasions corresponding to a plurality of SSSs that have an association relationship are the same, or the monitoring occasions totally overlap. This ensures that the terminal device can obtain a same start position of the physical shared channel regardless of a monitoring occasion corresponding to which SSS is used as the reference position by the terminal device. That is, this avoids a case that the network device sends only one physical shared channel but the terminal device determines at least two different start positions. The terminal device and the network device have same understandings of the start position of the physical shared channel, improving transmission efficiency on the physical shared channel.

Figure 10:
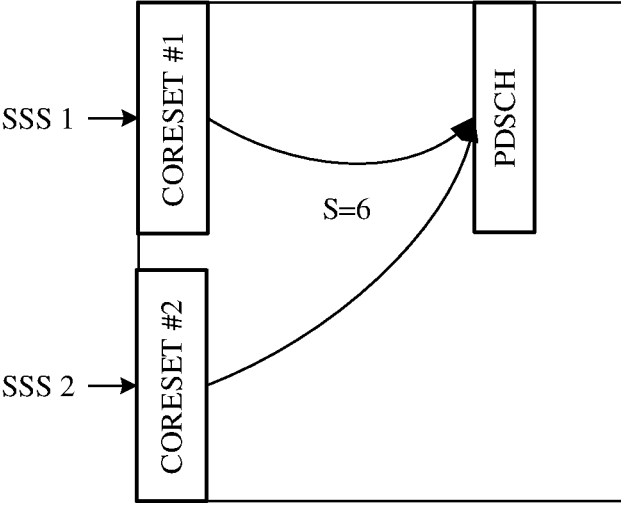
FIG. 10 is still another schematic diagram of a start position of a PDSCH according to an embodiment of this application.

For example, the physical shared channel is a PDSCH. FIG. 10 is still another schematic diagram of a start position of the PDSCH. It is assumed that an association relationship exists between an SSS 1 and an SSS 2. As agreed in a protocol, start positions of monitoring occasions configured for the SSS 1 and the SSS 2 are totally the same. In this case, DCI separately delivered on the two SSSs may indicate a same S value (it is assumed that S=6). The terminal device and the network device are not confused about the transmission start position of the PDSCH.

In this embodiment of this application, start positions or end symbol positions of monitoring occasions of a plurality of SSSs that have an association relationship are limited to the same, or the monitoring occasions totally overlap. This ensures that the terminal device learns of a correct start position of a physical shared channel while improving reliability of PDCCH detection and a latency, and improves transmission efficiency on the physical shared channel.

It should be understood that sequence numbers of the foregoing processes do not mean an execution sequence. The execution sequence of the processes should be determined based on functions and internal logic of the processes, and should not be constructed as any limitation on the implementation processes of embodiments of this application.

The foregoing describes in detail the data transmission method according to embodiments of this application with reference to FIG. 1 to FIG. 10. The following describes in detail data transmission apparatuses according to embodiments of this application with reference to FIG. 11 and FIG. 12.

Figure 11:
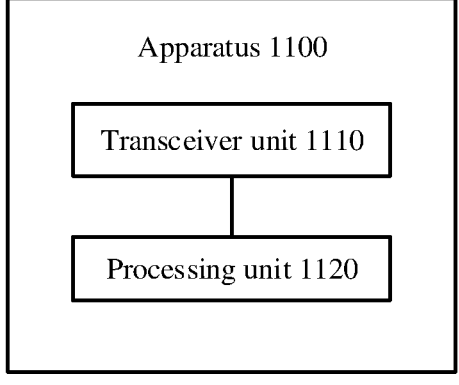
FIG. 11 is a schematic block diagram of a data transmission apparatus according to an embodiment of this application.

FIG. 11 shows a data transmission apparatus 1100 according to an embodiment of this application. In a design, the apparatus 1100 may be a terminal device, or may be a chip in the terminal device. In another design, the apparatus 1100 may be a network device, or may be a chip in the network device. The apparatus 1100 includes a transceiver unit 1110 and a processing unit 1120.

In a possible implementation, the apparatus 1100 is configured to perform procedures and steps corresponding to the terminal device in the foregoing method embodiments.

The transceiver unit 1110 is configured to perform blind detection on at least two physical downlink control channel PDCCH candidates, where the at least two PDCCH candidates are associated with different control resource sets CORESETs, and an association relationship exists between the at least two PDCCH candidates. The processing unit 1120 is configured to determine downlink control information DCI based on a result of blind detection performed on the at least two PDCCH candidates, where the DCI is used to schedule a physical shared channel. The transceiver unit 1110 is further configured to receive or send the physical shared channel based on the DCI.

Optionally, information bits on the at least two PDCCH candidates each include all information bits of the DCI; or information bits on the at least two PDCCH candidates each include a part of information bits of the DCI.

Optionally, the at least two PDCCH candidates have a same aggregation level AL and a same sequence number; or the at least two PDCCH candidates have different ALs and a same sequence number.

Optionally, the processing unit 1120 is further configured to determine a reference position, where the reference position is determined based on at least one CORESET in at least two CORESETs or at least one PDCCH candidate in the at least two PDCCH candidates; and determine a start position of the physical shared channel based on the reference position. The transceiver unit 1110 is specifically configured to receive or send the physical shared channel based on the start position of the physical shared channel.

Optionally, the reference position is a reference position determined based on a CORESET in the at least two CORESETs or a PDCCH candidate in the at least two PDCCH candidates.

Optionally, the processing unit 1120 is specifically configured to determine the start position of the physical shared channel based on the reference position and a first field in the DCI, where the first field indicates an offset of the start position of the physical shared channel relative to the reference position.

Optionally, the reference position is at least two reference positions determined based on start symbol positions of monitoring occasions corresponding to the at least two CORESETs or the at least two PDCCH candidates.

Optionally, the processing unit 1120 is specifically configured to determine at least two start positions based on the at least two reference positions and a first field in the DCI, where the first field indicates offsets of the at least two start positions relative to the at least two reference positions.

Optionally, the first field includes at least two second fields, where the at least two second fields have a correspondence with the at least two CORESETs or the at least two PDCCH candidates, and the at least two second fields indicate the offsets of the at least two start positions relative to the at least two reference positions. The processing unit 1120 is specifically configured to determine the at least two start positions based on the at least two reference positions and the at least two second fields.

Optionally, the monitoring occasions corresponding to the at least two PDCCH candidates have a same start symbol position or a same end symbol position, or the monitoring occasions totally overlap.

In another possible implementation, the apparatus 1100 is configured to perform procedures and steps corresponding to the network device in the foregoing method embodiments.

The processing unit 1120 is configured to determine to send downlink control information DCI on at least two physical downlink control channel PDCCH candidates, where the DCI is used to schedule a physical shared channel, the at least two PDCCH candidates are associated with different control resource sets CORESETs, and an association relationship exists between the at least two PDCCH candidates. The transceiver unit 1110 is configured to send the DCI on the at least two PDCCH candidates, and send or receive the physical shared channel based on the DCI.

Optionally, information bits on the at least two PDCCH candidates each include all information bits of the DCI; or information bits on the at least two PDCCH candidates each include a part of information bits of the DCI.

Optionally, the at least two PDCCH candidates have a same aggregation level AL and a same sequence number; or the at least two PDCCH candidates have different ALs and a same sequence number.

Optionally, the processing unit 1120 is further configured to determine a reference position, where the reference position is determined based on at least one CORESET in at least two CORESETs or at least one PDCCH candidate in the at least two PDCCH candidates; and determine a start position of the physical shared channel based on the reference position. The transceiver unit 1110 is specifically configured to send or receive the physical shared channel based on the start position of the physical shared channel.

Optionally, the reference position is a reference position determined based on a CORESET in the at least two CORESETs or a PDCCH candidate in the at least two PDCCH candidates.

Optionally, the processing unit 1120 is specifically configured to determine a first field in the DCI and the start position of the physical shared channel based on the reference position, where the first field indicates an offset of the start position of the physical shared channel relative to the reference position.

Optionally, the reference position is at least two reference positions determined based on start symbol positions of monitoring occasions corresponding to the at least two CORESETs or the at least two PDCCH candidates.

Optionally, the processing unit 1120 is specifically configured to determine a first field in the DCI and at least two start positions based on the at least two reference positions, where the first field indicates offsets of the at least two start positions relative to the at least two reference positions.

Optionally, the first field includes at least two second fields, where the at least two second fields have a correspondence with the at least two CORESETs or the at least two PDCCH candidates, and the at least two second fields indicate the offsets of the at least two start positions relative to the at least two reference positions. The processing unit 1120 is specifically configured to determine the at least two fields and the at least two start positions based on the at least two reference positions.

Optionally, the monitoring occasions corresponding to the at least two PDCCH candidates have a same start symbol position or a same end symbol position, or the monitoring occasions totally overlap.

It should be understood that the apparatus 1100 herein is embodied in a form of a functional unit. The term "unit" herein may refer to an application specific integrated circuit (ASIC), an electronic circuit, a processor (for example, a shared processor, a dedicated processor, or a group processor) and a memory configured to execute one or more software or firmware programs, a combined logic circuit, and/or another appropriate component that supports the described functions. In an optional example, a person skilled in the art may understand that the apparatus 1100 may be specifically the terminal device or the network device in the foregoing embodiments, and the apparatus 1100 may be configured to perform procedures and/or steps corresponding to the terminal device or the network device in the foregoing method embodiments. To avoid repetition, details are not described herein again.

The apparatus 1100 in the foregoing solutions has a function of implementing corresponding steps performed by the terminal device or the network device in the foregoing methods. The foregoing functions may be implemented by hardware, or may be implemented by hardware executing corresponding software. The hardware or the software includes one or more modules corresponding to the foregoing function. For example, the transceiver unit 1110 may include a sending unit and a receiving unit. The sending unit may be configured to implement steps and/or procedures that are corresponding to the transceiver unit and that are used to perform a sending action, and the receiving unit may be configured to implement steps and/or procedures that are corresponding to the transceiver unit and that are used to perform a receiving action. The sending unit may be replaced with a transmitter, and the receiving unit may be replaced with a receiver, to separately perform receiving and sending operations and related processing operations in the method embodiments.

In this embodiment of this application, the apparatus 1100 in FIG. 11 may alternatively be a chip or a chip system, for example, a system on chip (SoC). Correspondingly, the transceiver unit 1110 may be a transceiver circuit of the chip. This is not limited herein.

Figure 12:
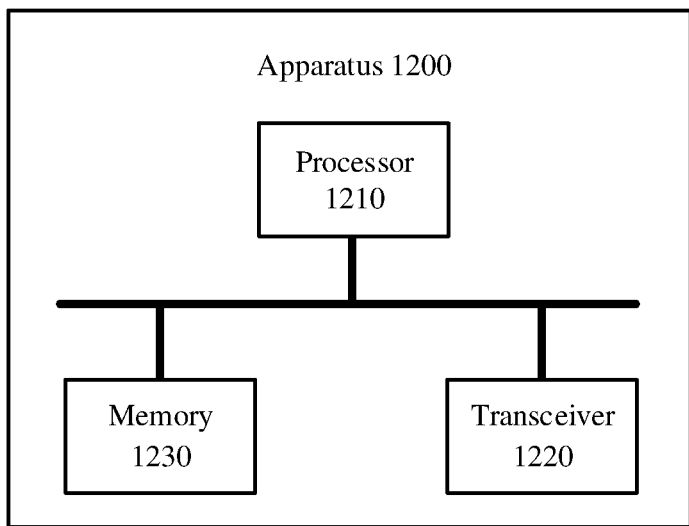
FIG. 12 is a schematic block diagram of another data transmission apparatus according to an embodiment of this application.

FIG. 12 shows another data transmission apparatus 1200 according to an embodiment of this application. The apparatus 1200 includes a processor 1210, a transceiver 1220 and a memory 1230. The processor 1210, the transceiver 1220, and the memory 1230 communicate with each other by using an internal connection path. The memory 1230 is configured to store instructions, and the processor 1210 is configured to execute the instructions stored in the memory 123o, to control the transceiver 1220 to send a signal and/or receive a signal.

In a possible implementation, the apparatus 1200 is configured to perform procedures and steps corresponding to the terminal device in the foregoing method 200.

The transceiver 1220 is configured to perform blind detection on at least two physical downlink control channel PDCCH candidates, where the at least two PDCCH candidates are associated with different control resource sets CORESETs, and an association relationship exists between the at least two PDCCH candidates. The processor 1210 is configured to determine downlink control information DCI based on a result of blind detection performed on the at least two PDCCH candidates, where the DCI is used to schedule a physical shared channel. The transceiver 1220 is further configured to receive or send the physical shared channel based on the DCI.

In another possible implementation, the apparatus 1200 is configured to perform procedures and steps corresponding to the network device in the foregoing method 200.

The processor 1210 is configured to determine to send downlink control information DCI on at least two physical downlink control channel PDCCH candidates, where the DCI is used to schedule a physical shared channel, the at least two PDCCH candidates are associated with different control resource sets CORESETs, and an association relationship exists between the at least two PDCCH candidates. The transceiver 1220 is configured to send the DCI on the at least two PDCCH candidates, and send or receive the physical shared channel based on the DCI.

It should be understood that the apparatus 1200 may be specifically the terminal device or the network device in the foregoing embodiments, and the apparatus 1200 may be configured to perform steps and/or procedures corresponding to the terminal device or the network device in the foregoing method embodiments. Optionally, the memory 1230 may include a read-only memory and a random access memory, and provide instructions and data for the processor. A part of the memory may further include a non-volatile random access memory. For example, the memory may further store information about a device type. The processor 1210 may be configured to execute the instructions stored in the memory. When the processor 1210 executes the instructions stored in the memory, the processor 1210 is configured to perform the steps and/or procedures corresponding to the terminal device or the network device in the foregoing method embodiments. The transceiver 1220 may include a transmitter and a receiver. The transmitter may be configured to implement steps and/or procedures that are corresponding to the transceiver and that are used to perform a sending action, and the receiver may be configured to implement steps and/or procedures that are corresponding to the transceiver and that are used to perform a receiving action.

It should be understood that in this embodiment of this application, the processor in the apparatus may be a central processing unit (CPU), or may be another general-purpose processor, a digital signal processor (DSP), an application-specific integrated circuit (ASIC), a field programmable gate array (FPGA) or another programmable logic device, a discrete gate or transistor logic device, or a discrete hardware component. The general-purpose processor may be a microprocessor or any conventional processor or the like.

In an implementation process, steps in the foregoing method may be completed by using an integrated logic circuit of hardware in the processor or instructions in a form of software. The steps of the method disclosed with reference to embodiments of this application may be directly performed by a hardware processor, or may be performed by using a combination of hardware and software units in the processor. The software unit may be located in a mature storage medium in the art, such as a random access memory, a flash memory, a read-only memory, a programmable read-only memory, an electrically erasable programmable memory, or a register. The storage medium is located in the memory, and the processor executes the instructions in the memory, and completes steps of the foregoing method in combination with the hardware of the processor. To avoid repetition, details are not described herein again.

A person of ordinary skill in the art may be aware that, in combination with the method steps and units described in embodiments disclosed in this specification, the method steps and units may be implemented by electronic hardware, computer software, or a combination thereof. To clearly describe interchangeability between the hardware and the software, steps and compositions of embodiments have been generally described in the foregoing description according to functions. Whether these functions are performed by hardware or software depends on particular applications and design constraints of the technical solutions. A person of ordinary skill in the art may use different methods to implement the described functions for each particular application, but it should not be considered that the implementation goes beyond the scope of this application.

An embodiment of this application further provides a communication system. The communication system may include the terminal device (the apparatus 1100 or the apparatus 1200 is represented as the terminal device) shown in FIG. 11 or FIG. 12 and the network device (the apparatus 1100 or the apparatus 1200 is represented as the network device) shown in FIG. 11 or FIG. 12.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed systems, apparatuses and methods may be implemented in other manners. For example, the foregoing described apparatus embodiments are merely examples. For example, the unit division is merely logical function division and there may be other division in an actual implementation. For example, a plurality of units or components may be combined or integrated into another system, or some features may be ignored or not executed. In addition, the displayed or discussed mutual couplings, direct couplings, or communication connections may be implemented through indirect couplings or communication connections between some interfaces, apparatuses or units, or may be implemented in electrical, mechanical, or other forms.

The units described as separate parts may or may not be physically separate, and parts displayed as units may or may not be physical units, may be located in one position, or may be distributed on a plurality of network units. A part or all of the units may be selected based on actual requirements to achieve the objectives of the solutions of embodiments of this application.

In addition, functional units in embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially or a part that makes a contribution to the prior art, or all or a part of the technical solutions may be embodied in a form of a software product. The computer software product is stored in a storage medium, and the product includes several instructions for instructing a computer device (which may be a personal computer, a server, a network device, or the like) to perform all or some steps of the methods described in embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any modification or replacement readily figured out by a person skilled in the art within the technical scope disclosed in this application shall fall within the protection scope of this application. Therefore, the protection scope of this application shall be subject to the protection scope of the claims.

What is claimed is:

1. A method, comprising:
performing blind detection on at least two physical downlink control channel (PDCCH) candidates, wherein the at least two PDCCH candidates are associated with different control resource sets (CORESETs), and wherein the at least two PDCCH candidates are associated by an association relationship, and the association relationship is based on the at least two PDCCH candidates having a same aggregation level (AL) and a same sequence number in respective search space sets;
determining downlink control information (DCI) based on a result of the blind detection performed on the at least two PDCCH candidates, wherein the DCI schedules a physical shared channel, wherein information bits on the at least two PDCCH candidates each comprise all information bits of the DCI;
determining a start position of the physical shared channel based on a reference position, wherein the reference position is determined based on at least one CORESET in at least two CORESETs or at least one PDCCH candidate in the at least two PDCCH candidates, wherein the reference position is a start symbol position of a monitoring occasion of a search space set corresponding to a PDCCH candidate with a rearmost time domain position in the at least two PDCCH candidates; and
receiving or sending the physical shared channel based on the start position.

2. The method according to claim 1, wherein monitoring occasions corresponding to the at least two PDCCH candidates have a same start symbol position.

3. The method according to claim 1, wherein monitoring occasions corresponding to the at least two PDCCH candidates have a same end symbol position.

4. The method according to claim 1, wherein monitoring occasions corresponding to the at least two PDCCH candidates completely overlap.

5. The method according to claim 1, wherein PDCCH candidates are sequence numbered at a same AL in a same search space set.

6. A method, comprising:
sending downlink control information (DCI) on at least two physical downlink control channel (PDCCH) candidates, wherein the DCI schedules a physical shared channel, wherein the at least two PDCCH candidates are associated with different control resource sets (CORESETs), wherein the at least two PDCCH candidates are associated by an association relationship, and the association relationship is based on the at least two PDCCH candidates having a same aggregation level (AL) and a same sequence number in respective search space sets, and wherein information bits on the at least two PDCCH candidates each comprise all information bits of the DCI;
determining a start position of the physical shared channel based on a reference position, wherein the reference position is determined based on at least one CORESET in at least two CORESETs or at least one PDCCH candidate in the at least two PDCCH candidates, wherein the reference position is a start symbol position of a monitoring occasion of a search space set corresponding to a PDCCH candidate with a rearmost time domain position in the at least two PDCCH candidates; and
sending or receiving the physical shared channel based on the start position.

7. The method according to claim 6, wherein monitoring occasions corresponding to the at least two PDCCH candidates have a same start symbol position.

8. The method according to claim 6, wherein monitoring occasions corresponding to the at least two PDCCH candidates have a same end symbol position.

9. The method according to claim 6, wherein monitoring occasions corresponding to the at least two PDCCH candidates completely overlap.

10. The method according to claim 6, wherein PDCCH candidates are sequence numbered at a same AL in a same search space set.

11. An apparatus, comprising:

at least one processor; and a non-transitory memory storing programming instructions that are executable by the at least one processor, the programming including instructions for:

performing blind detection on at least two physical downlink control channel (PDCCH) candidates, wherein the at least two PDCCH candidates are associated with different control resource sets (CORESETs), and wherein the at least two PDCCH candidates are associated by an association relationship, and the association relationship is based on the at least two PDCCH candidates having a same aggregation level (AL) and a same sequence number in respective search space sets;

determining downlink control information (DCI) based on a result of blind detection performed on the at least two PDCCH candidates, wherein the DCI schedules a physical shared channel, and wherein information bits on the at least two PDCCH candidates each comprise all information bits of the DCI;

determining a start position of the physical shared channel based on a reference position, wherein the reference position is determined based on at least one CORESET in at least two CORESETs or at least one PDCCH candidate in the at least two PDCCH candidates, wherein the reference position is a start symbol position of a monitoring occasion of a search space set corresponding to a PDCCH candidate with a rearmost time domain position in the at least two PDCCH candidates; and receiving or sending the physical shared channel based on the start position.

12. The apparatus according to claim 11, wherein monitoring occasions corresponding to the at least two PDCCH candidates have a same start symbol position.

13. The apparatus according to claim 11, wherein monitoring occasions corresponding to the at least two PDCCH candidates have a same end symbol position.

14. The apparatus according to claim 11, wherein monitoring occasions corresponding to the at least two PDCCH candidates completely overlap.

15. The apparatus according to claim 11, wherein PDCCH candidates are sequence 55, numbered at a same AL in a same search space set.

16. An apparatus, comprising:

at least one processor; and a non-transitory memory storing programming instructions that are executable by the at least one processor, the programming including instructions for:

sending downlink control information (DCI) on at least two physical downlink control channel (PDCCH) candidates, wherein the DCI schedules a physical shared channel, wherein the at least two PDCCH candidates are associated with different control resource sets (CORESETs), wherein the at least two PDCCH candidates are associated by an association relationship, and the association relationship is based on the at least two PDCCH candidates having a same aggregation level (AL) and a same sequence number in respective search space sets, and wherein information bits on the at least two PDCCH candidates each comprise all information bits of the DCI;

determining a start position of the physical shared channel based on a reference position, wherein the reference position is determined based on at least one CORESET in at least two CORESETs or at least one PDCCH candidate in the at least two PDCCH candidates, wherein the reference position is a start symbol position of a monitoring occasion of a search space set corresponding to a PDCCH candidate with a rearmost time domain position in the at least two PDCCH candidates; and sending or receiving the physical shared channel based on the DCI.

17. The apparatus according to claim 16, wherein monitoring occasions corresponding to the at least two PDCCH candidates have a same start symbol position.

18. The apparatus according to claim 16, wherein monitoring occasions corresponding to the at least two PDCCH candidates have a same end symbol position.

19. The apparatus according to claim 16, wherein monitoring occasions corresponding to the at least two PDCCH candidates completely overlap.

20. The apparatus according to claim 16, wherein PDCCH candidates are sequence numbered at a same AL in a same search space set.

* * * * *